US010009388B2

(12) United States Patent
Selvaraj et al.

(10) Patent No.: US 10,009,388 B2
(45) Date of Patent: Jun. 26, 2018

(54) METHOD AND SYSTEM FOR ESTABLISHING INTEGRATED GROUP ISC SESSION BASED ON CONTENT INTEREST

(71) Applicant: Samsung Electronics Co., Ltd., Gyeonggi-do (KR)

(72) Inventors: Ashok Kumar Selvaraj, Pondicherry (IN); Basavaraj Jayawant Pattan, Bangalore (IN); Gyubong Oh, Gyeonggi-do (KR); Kyung-Tak Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 621 days.

(21) Appl. No.: 14/489,032

(22) Filed: Sep. 17, 2014

(65) Prior Publication Data
US 2015/0081776 A1    Mar. 19, 2015

(30) Foreign Application Priority Data

Sep. 17, 2013 (IN) .......................... 4142/CHE/2013
Sep. 20, 2013 (IN) .......................... 4261/CHE/2013
Sep. 10, 2014 (IN) .......................... 4142/CHE/2013

(51) Int. Cl.
*G06F 15/16* (2006.01)
*H04L 29/06* (2006.01)
(Continued)

(52) U.S. Cl.
CPC ...... *H04L 65/1069* (2013.01); *H04L 65/1006* (2013.01); *H04L 67/10* (2013.01); *H04L 67/22* (2013.01); *H04W 4/08* (2013.01)

(58) Field of Classification Search
CPC . H04L 65/1069; H04L 65/1006; H04L 67/10; H04L 67/22; H04W 4/08
(Continued)

(56) References Cited

U.S. PATENT DOCUMENTS

2004/0107250 A1* 6/2004 Marciano ................ H04L 29/06
709/204
2006/0230168 A1    10/2006 Sung et al.
(Continued)

OTHER PUBLICATIONS

Open Mobile Alliance, "Immersive Social Centre Architecture", OMA-AD-ISC-V1_0-20130624-D, Draft Version 1.0, Jun. 24, 2013.
(Continued)

*Primary Examiner* — S M Rahman
(74) *Attorney, Agent, or Firm* — The Farrell Law Firm, P.C.

(57) ABSTRACT

A method and system for establishing an integrated group Immersive Social Center (ISC) session for a content viewing and a communication by an ISC server to deliver contents associated with a content interest is disclosed. The group ISC session is established for a pre-defined group created with members indicating interest in the group ISC session initiated by an initiator ISC client. The method allows the ISC server to receive the content interest from an initiator ISC client. Further, the members of the pre-defined group can schedule time for the integrated group ISC session. The content interest received from the initiator ISC client is selected by the ISC user of the initiator ISC client from a personalized contents list, based on static preference or on demand preference of the ISC user, sent by the ISC server or an ISC XML Document Server (XDMS).

31 Claims, 13 Drawing Sheets

(51) Int. Cl.
*H04L 29/08* (2006.01)
*H04W 4/08* (2009.01)
(58) Field of Classification Search
USPC .......................................................... 709/203
See application file for complete search history.

(56) References Cited

U.S. PATENT DOCUMENTS

| | | | | |
|---|---|---|---|---|
| 2007/0074017 | A1* | 3/2007 | Schmidt | H04L 63/0428 |
| | | | | 713/150 |
| 2008/0268825 | A1* | 10/2008 | Allen | H04M 3/42042 |
| | | | | 455/415 |
| 2009/0271781 | A1* | 10/2009 | Cui | G06F 8/61 |
| | | | | 717/173 |
| 2010/0009704 | A1* | 1/2010 | Fan | H04L 65/1006 |
| | | | | 455/466 |

OTHER PUBLICATIONS

Open Mobile Alliance, "ADRR Comment Section 5.3.1 and 5.3.2", OMA-AD-ISC-V1_0-20130624-D, Sep. 13, 2013.
European Search Report dated Feb. 5, 2015 issued in counterpart application No. 14185378.8-1870.

* cited by examiner

METHOD AND SYSTEM FOR ESTABLISHING INTEGRATED GROUP ISC SESSION BASED ON CONTENT INTEREST

PRIORITY

This application claims the priority under 35 U.S.C. § 119(a) to Indian Provisional patent application Serial No. 4142/CHE/2013, which was filed in the Indian Intellectual Property Office on Sep. 17, 2013, and Indian Provisional patent application Serial No. 4261/CHE/2013, which was filed in the Indian Intellectual Property Office on Sep. 20, 2013, and Indian Complete patent application Serial No. 4142/CHE/2013, which was filed in the Indian Intellectual Property Office on Sep. 10, 2014, the entire content of which are incorporated herein by reference.

BACKGROUND OF THE INVENTION

1. Field of the Invention

The present invention relates to mobile communications on mobile devices with integrated content viewing and communication and more particularly to establish an integrated group session for collaborative content viewing.

2. Description of the Related Art

Open Mobile Alliance (OMA) has identified requirements of the Immersive Social Centre (ISC) enabler for enhancing user experience with value added features to provide immersive (being their-being with) experience. These value added features include enabling multiple communication devices identified as a group to simultaneously organize a content viewing session and a communication session to enable integration of content viewing and communication session in the group with reference to the content being viewed. The integrated sessions for a group of ISC users established by an ISC enabler in an ISC architecture is an integrated group ISC session.

Interested content be viewed called a content interest can be selected by an ISC user interested in initiating the integrated group ISC session from a received list of the real-time or non-real-time contents provided by a service provider. The ISC user can receive a full XDM document (a full contents list) or a partial XDM document (a partial contents list). However, the partial contents list is based on only pre-defined user preferences and thus is limited to only static preferences of the ISC user. The content interest is then to be conveyed to the components of the ISC enabler that enable establishing the integrated group ISC session.

Delivering a contents list to the ISC user based on varied user preferences and user's context information not limited to static preferences of the ISC user can enhance the user experience. Also, providing efficient methods for conveying the content interest of the ISC user to the ISC enabler components in the wireless network to view the content interest during the integrated group ISC session will be appreciated.

SUMMARY OF THE INVENTION

The principal object of the embodiments herein is to provide a method and system for establishing an integrated group Immersive Social Centre (ISC) session for a content viewing and a communication, among members of a pre-defined group by an ISC server for delivering content associated with a content interest expressed by an initiator ISC client.

Another object of the invention is to provide a method for delivering a personalized contents list or a full contents list to an ISC user based on static user preferences or on-demand user preferences and/or user's context information of the ISC user associated with the initiator ISC client. Further, allowing the ISC user to select the content interest for the integrated group ISC session from the personalized contents list.

Accordingly the invention provides a method for establishing an integrated group Immersive Social Centre (ISC) session for content viewing and communication based on a content interest. Further, the method comprises receiving the content interest by the ISC session server, wherein the content interest is received in a request from the initiator ISC client for initiation of the integrated group ISC session. Further, the method comprises interacting with at least one recipient ISC client from a plurality of recipient ISC clients by the ISC session server for communicating the content interest. The plurality of recipient ISC clients is available to the ISC session server as a Uniform Resource Indicator (URI) list in the received request. Furthermore, the method comprises identifying each interested ISC client among the plurality of recipient ISC clients, by the ISC session server, that indicate interest in the content interest. Furthermore, the method comprises establishing the integrated group ISC session among members of a pre-defined group by the ISC session server to deliver content associated with the content interest. The members of the pre-defined group include the initiator ISC client and each the interested ISC client.

Accordingly the invention provides a system for establishing an integrated group Immersive Social Centre (ISC) session for content viewing and communication based on a content interest. The system comprises an ISC session server, an initiator ISC client, and a plurality of recipient ISC clients. The initiator ISC client is configured to receive a request to initiate the integrated group ISC session based on the content interest. The initiator ISC client is further configured to generate and send a request with the content interest to the ISC session server for initiation of the integrated group ISC session. Further, the ISC session server is configured to interact with at least one recipient ISC client from the plurality of recipient ISC clients for communicating the content interest. The plurality of recipient ISC clients is available to the ISC session server as a Uniform Resource Indicator (URI) list in the request sent by the initiator ISC client. The ISC session server is further configured to identify each interested ISC client among the plurality of recipient ISC clients indicating interest in the content interest. The ISC session server is further configured to establish the integrated group ISC session among members of a pre-defined group to deliver content associated with the content interest. The members of the pre-defined group include the initiator ISC client and each of the interested ISC clients.

Accordingly the invention provides a computer program product comprising computer executable program code recorded on a computer readable non-transitory storage medium, the computer executable program code when executed, causing the actions including receiving a content interest in a request for initiation of a integrated group ISC session from an initiator ISC client by an ISC session server in an ISC architecture. Further, the actions caused by execution of the executable program code include interacting with at least one recipient ISC client from a plurality of recipient ISC clients by the ISC session server for communicating the content interest. The plurality of recipient ISC clients is available to the ISC session server as a Uniform Resource Indicator (URI) list in the received request. Further, the actions caused by execution of the executable program code include identifying each interested ISC client among the plurality of recipient ISC clients indicating interest in the content interest by the ISC session server. Furthermore, the actions caused by execution of the executable program code include establishing the integrated group ISC session among members of a pre-defined group by the ISC session server to deliver content associated with the content interest. The members of the pre-defined group includes the initiator ISC client and each the interested ISC client.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS OF THE PRESENT INVENTION

Figure 1:
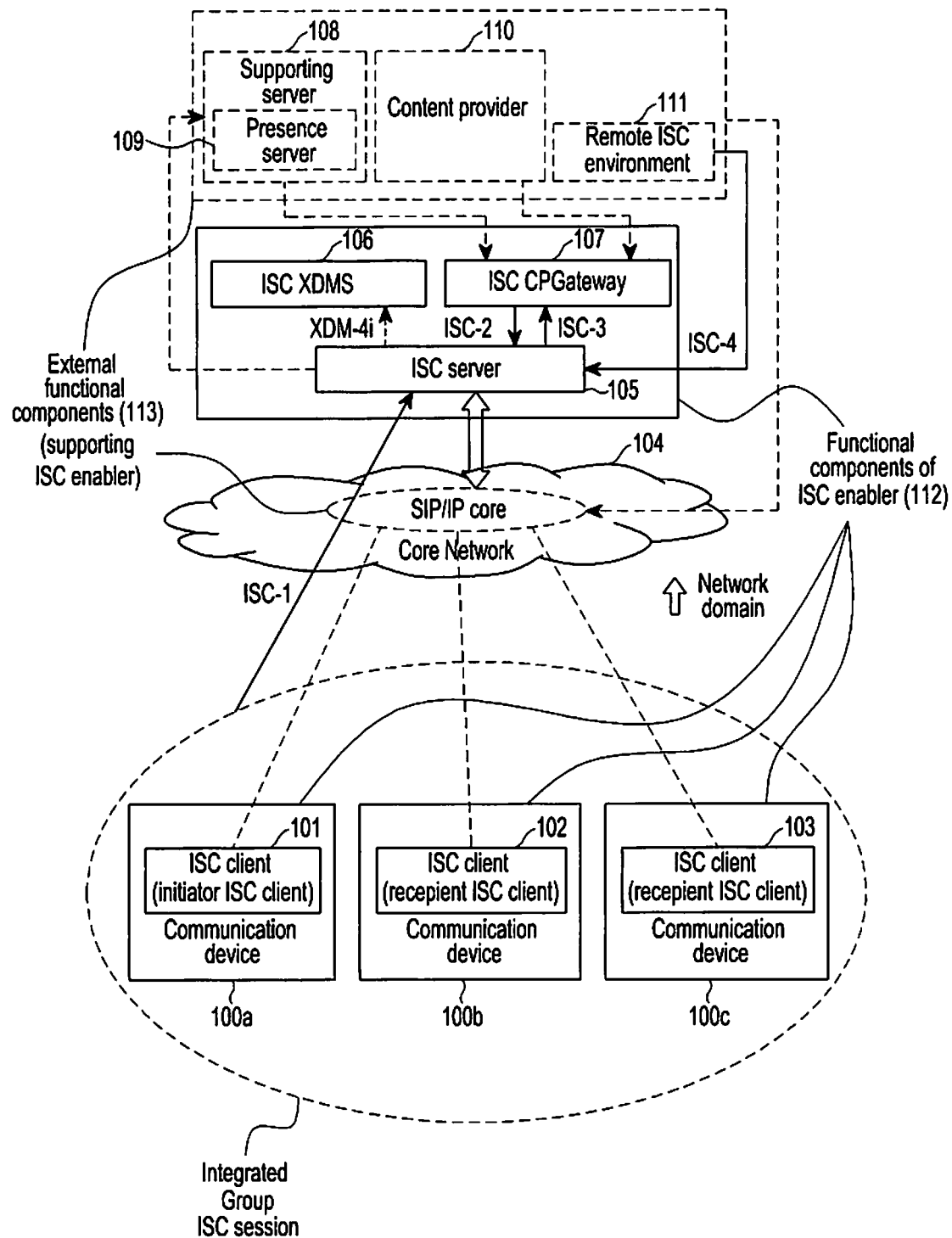
FIG. 1 illustrates an Immersive Social Centre (ISC) architecture for establishing an integrated group ISC session for a content viewing and a communication based on a content interest expressed by an initiator ISC client, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Prior to describing the embodiments in detail, it is useful to provide definitions for key terms and concepts used herein. Unless defined otherwise, all technical and scientific terms used herein have the same meaning as commonly understood by a person having ordinary skill in the art to which this invention belongs.

Initiator Immersive Social Centre (ISC) client: Refers to an ISC client on a communication device that initiates an ISC session. The ISC session is initiated by an initiator ISC client on receiving a request from a user (ISC user) and receiving ISC service from an ISC enabler provided by an ISC environment. The ISC session can be a personal ISC session, a one to one ISC session or a group ISC session. Further, the initiator ISC client is also called the originating client.

Recipient ISC client: Refers to an ISC client on another communication device of another ISC user participating in the ISC session. The ISC session referred here can be one to one ISC session or a group ISC session initiated by the initiator ISC client. Here, group ISC session may involve a session established among multiple ISC clients forming the group. Further, the recipient ISC client is also called the terminating client. Further, the group ISC session integrating a content viewing and a communication for delivering contents associated with a content interest expressed by an ISC user associated with the initiator ISC client is called the integrated group ISC session.

The embodiments herein achieve a method and system for establishing an integrated group Immersive Social Centre (ISC) session for a content viewing and a communication by an ISC server based on the content interest expressed by an ISC user. The integrated group ISC session is established for a pre-defined group created with members indicating interest to watch the content in the group ISC session initiated by an initiator ISC client. The members are interested recipient ISC clients from plurality of recipient ISC clients in a Uniform Resource Identifier (URI) list of the initiator ISC client. The method allows the ISC server to receive the content interest from the initiator ISC client.

In an embodiment, the ISC session server can be a presence server or an ISC server in the ISC architecture. The method allows the ISC server to receive and further deliver contents associated with the content interest by establishing the integrated ISC session for the content viewing and the communication. Further, the method allows the members of the pre-defined group to interact with each other for scheduling time for the integrated group ISC session for the content viewing and the communication of interested content. The method allows the ISC server (or Presence server) to receive the published content-delivery information of an initiator ISC client for the content interest. The method allows the ISC server to send alert notifications before delivering the content interest during the established group ISC session for content viewing and the communication. The content interest received from the initiator ISC client is selected by the ISC user of the initiator ISC client from a contents list sent by the ISC server or an ISC Extensible Markup Language Document Management Server (XDMS) in the ISC architecture. The contents list can be a personalized contents list or a full contents list. The personalized contents list is generated by the ISC server or the ISC XDMS based on static user preferences or on demand user preferences of the ISC user associated with the initiator ISC client.

Establishing of the group ISC session for the content viewing and the communication includes performing plurality of steps by the ISC server. The method allows the ISC server to create the pre-defined group for the group ISC session, establish group ISC session for communication to allow scheduling for the group ISC session for content viewing and communication. Further, the method allows the ISC server to notify interested recipient ISC clients on corresponding communication devices about scheduled time and send an alert notification before delivering the contents associated with the content interest and establish the group ISC session based on SIP protocol and deliver the contents associated with the content interest to members of the pre-defined group.

The exchange of SIP protocol signals for establishment of the integrated group ISC session and/or any other ISC session such a one to one ISC session or a group ISC session for the content viewing and/or communication is performed as disclosed in Combined Complete application in pursuance to the Provisional Application No. 4201/CHE/2013 & 4223/CHE/2013 filed with the Indian Patent Office.

The initiator ISC client and the recipient ISC client is a client module on a communication device. In an embodiment, the communication device can be a smart phone, a tablet, a personal digital assistant, a palmtop, a laptop and any other communication device capable handling the ISC session.

Referring now to the drawings that include FIGS. 1 through 13, where similar reference characters denote corresponding features consistently throughout the figures, there are shown preferred embodiments.

FIG. 1 illustrates Immersive Social Centre (ISC) architecture for establishing an integrated group ISC session for a content viewing and a communication based on a content interest expressed by an initiator ISC client, according to embodiments as disclosed herein. The figure depicts the ISC environment with plurality of components of the ISC architecture.

As per the standard specification provided by the OMA alliance, the ISC architecture includes an ISC enabler 112 including plurality of functional components and supported by external functional components 113. The ISC enabler 111 includes an ISC client 101 (initiator ISC client), an ISC client 102 (recipient ISC client) and an ISC client 103 (recipient ISC client) in the communication device 100*a*, 100*b* and 100*c* respectively. In the network domain, the ISC enabler 111 includes an ISC server 105, an ISC XML Document Management Server (ISC XDMS) 106 and an ISC CP Gateway (CP Gateway) 107. The ISC enabler functional components in the network domain are supported by external functional components 112 including but not limited to SIP/IP core of the core network 104, a supporting server 108 with a presence server 109, a content provider 110 and a remote ISC environment 111.

The method disclosed allows the initiator ISC client 101 to initiate the integrated group ISC session for the content viewing and the communication among ISC users of communication devices 100*b* and 100*c* respectively in the ISC environment depicted by the FIG. 1. An ISC session includes as an ISC session for communication established by the ISC server 105 after creating the pre-defined group for allowing the members of the pre-defined group to schedule time for watching the content associated with the content interest. The ISC session also includes the integrated group ISC session established to deliver contents associated with a content interest expressed by the ISC user. The ISC session initiation request from the ISC user is communicated to the ISC server 105 of the ISC enabler through the SIP/IP core of the core network 104 that provides SIP/IP-based functionalities required by the ISC enabler.

The presence server 109 provides ISC Users with the possibility to publish and retrieve presence Information. It also allows the ISC user to publish the content-delivery information (time decided for later delivery of the content and time to receive the alert notification before the content is delivered) and notify subscribed ISC users the content-delivery information. It also allows ISC Users to obtain the presence Information of other ISC Users. The functionalities provided by a Presence Enabler are specified in [OMA-PRS-AD]. The ISC enabler 112 uses the functionalities of the Presence Enabler to obtain Presence Information. The ISC Clients 101, 102, 103 respectively interacts with the Presence Enabler via the PRS-1 and PRS-2 reference points defined by the Presence Enabler.

The initiator ISC client 101 can select the content interest from a contents list provided by the ISC server or the ISC XDMS. The contents list can be a personalized contents list based on one or more static user preferences, a personalized contents list based on one or more on-demand user preferences and/or user's context information or a FullContentList.

In an embodiment, a request, by the initiator ISC client, to retrieve the contents list includes a UserChoice element whose sub-element RefName is set to either ReferPredefinedPref indicating static user preferences, ReferOnDemandPref indicating on-demand user preferences or FullContentsList indicating full contents list requested by an ISC user associated with the initiator ISC client 101. As a person skilled in the art understands, the full contents list can be readily available with the ISC XDMS 106 or can be retrieved by the ISC XDMS using various protocols such as XCAP GET and the like.

The ISC XDMS 106 (XDMS) in the ISC architecture stores and manages XML documents. The functionalities provided by the XDMS are specified in [OMA-XDM-AD]. The XDM Enabler provides XDM operations for ISC User Preferences Profiles, access policies, user lists and group definitions.

In an embodiment, the content, associated with the content interest, delivered to the members during the integrated group ISC session can be media content such as a live content, a video on demand and the like and is provided by the content provider 110.

The communication devices 100a, 100b and 100c respectively are illustrated for simplicity of understanding. However, the ISC environment can include a plurality of communication devices capable of participating in the ISC session on receiving a request from any initiator ISC client in the ISC environment.

Figure 2:
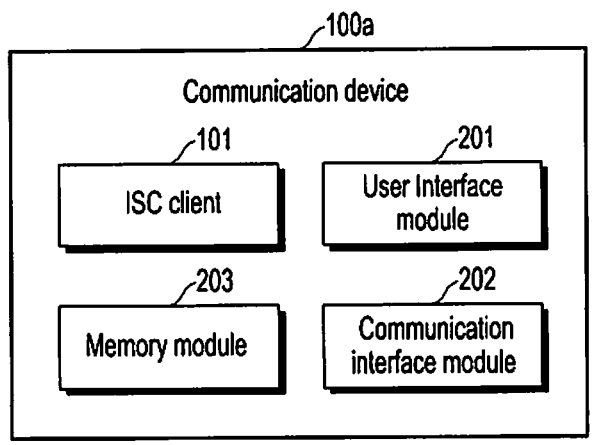
FIG. 2 illustrates modules of the communication device for establishing the integrated group ISC session, according to embodiments as disclosed herein.

FIG. 2 illustrates modules of the communication device for establishing the integrated group ISC session, according to embodiments as disclosed herein. The figure illustrates modules of a communication device for establishing the ISC session, according to embodiments as disclosed herein. The communication device 100a includes the ISC client 101, a User Interface (UI) module 201, a communication interface module 201 and a memory module 203. The ISC client 101 is configured to function as the initiator ISC client when the ISC user requests for establishing the ISC session and is configured to function as the recipient ISC client when the ISC client receives request from the ISC server 105 for participating in the initiated ISC session. The ISC client 101 is configured to receive request from the ISC user and initiate various SIP based messages and control signals towards the ISC server 105, the presence server 108 and/or the ISC XDMS 106 for retrieving the contents list and establishing the integrated group ISC session. The ISC client 101 performs functions required for both the content viewing and the communication. Further, the ISC client 101 performs the functions for fetching (retrieving) the contents list (including metadata) from the ISC server 105 based on access rights. The possible contents may include but are not limited to contents (live or non-live) from the content provider, user generated contents (live or non-live), associated contents and preview of content(s).

The User Interface (UI) module 201 can provide the necessary user interface for the ISC client 101 to receive ISC session establishment request from the ISC user as well as provide indications to the ISC user depicting progress of the initiated ISC session. The communication interface module 202 provides the necessary communication interface to the ISC client 101 to communicate with the ISC server 105, the presence server 108 and the ISC XDMS 106.

The ISC client 101 when configured to function as recipient ISC client notifies the ISC user about the initiated integrated group ISC session and sends control signals and messages to the ISC server 105 based the corresponding ISC users consent to participate in the integrated group ISC session.

The memory module 303 stores contact details and URI list of other ISC users, to be used by the ISC client 101 during the initiation of the ISC session.

For simplicity and ease of understanding, the modules in communication device 100a are limited to the embodiments of the invention. However, the communication device 100a includes various other modules to support additional functionalities and operations of the communication device 100a.

Although it is illustrated in FIG. 2 that the modules are present in the communication device 100a, it has to be understood by a person of ordinary skill in the art to incorporate the same modules in other communication devices such as communication device 100b and communication device 100c. The names of the modules of the communication device 100a are used for illustrative purposes only and should not be considered as a limitation.

Figure 3:
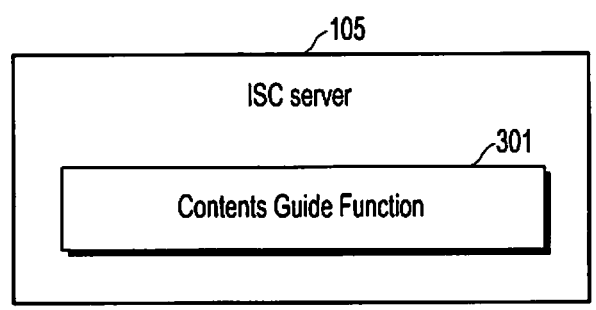
FIG. 3 illustrates modules of an ISC server for establishing the group ISC session initiated by the initiator ISC client, according to embodiments as disclosed herein.

FIG. 3 illustrates modules of an ISC server for establishing the group ISC session initiated by the initiator ISC client, according to embodiments as disclosed herein. FIG. 3 illustrates module of the ISC server 105 for providing the contents list requested by the ISC user. The ISC server 105 includes a Contents Guide function 301 that along with other functional components as defined by the OMA. However for simplicity of understanding the functional components relevant to the method disclosed are illustrated and explained. The other functional components of the ISC server including but not limited to a media function and a communication function for handling establishment of the ISC sessions, an associated Contents Guide function, a Multi-device Discovery function, a Social function, a Storage function perform functions to support the contents guide function 301 provide the contents list to the requesting ISC user. The ISC server 105 is configured to receive requests for contents list and initiation of ISC sessions and further establish the requested ISC sessions. Also, the functional interaction between the functional components of the ISC server 105 is as defined in the Open mobile alliance (OMA) standard and is not explained for brevity.

The Contents Guide Function 301 is configured to provide personalized contents list based on user's context information and user preferences (including metadata) such contents (live or non-live) from content provider 110, user generated contents (live or non-live), and associated contents.

The contents guide function 301 functionalities include but not limited to providing full contents list, sorting of list of available contents as per ISC user specified criteria, searching contents in the contents list, personalization of contents list based on context information of the ISC user (user context) and user preferences, synchronization of contents list with the content provider 110, management (for e.g., removing from availability list, access control list, categorization) of contents. Based on the type of contents list request from the ISC Client, the list of contents includes Content Provider contents (live and non-live), Associated Contents and user Generated Contents (live and non-live).

The communication function in the ISC server 105 performs following functionalities such as:

Perform content viewing and communication session handling (session initiation, modification and termination) related functions.

Provide support for simultaneous sessions for content Viewing and communication.

Maintain integration information of content viewing and communication with one to one ISC session (1-1 ISC session) and group ISC session (1-many ISC session).

Generate the content viewing Group information.

Generate the content view information for sharing to other ISC Users.

Provide support for synchronizing the content viewing between ISC Users.

The communication function of the ISC server 105 interacts with other ISC network components such as a XDM Enabler for the retrieval of user preferences, groups and policies, the Presence Enabler (via Presence Source) for publishing content viewing information and communication information in 1-1 and 1-many ISC sessions, between multi-communication devices when content viewing and communication being distributed on different devices.

The media function of the ISC server 105 supports the following functionalities such as providing centralized mixing of contents (primary content, Associated Content, Remote ISC User content) based on spatial configuration of devices and multi-device capabilities.

The names of the modules of the ISC server 105 are used for illustrative purposes only and should not be considered as a limitation.

Figure 4A:
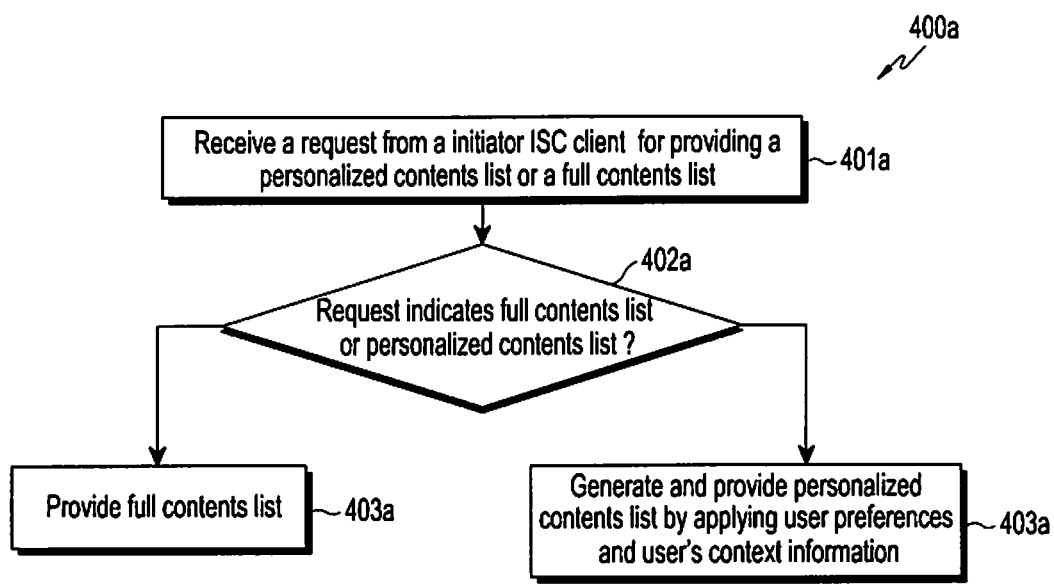
FIG. 4A is a flow diagram illustrating a method for providing a contents list to an ISC user associated with the initiator ISC client on receiving request for a personalized contents list or a full contents list, according to embodiments as disclosed herein

FIG. 4A is a flow diagram illustrating a method 400a for providing a contents list to an ISC user associated with the initiator ISC client on receiving request for a personalized contents list or a full contents list, according to embodiments as disclosed herein. At step 401a, the method 400a configures the ISC server 105 or the ISC XDMS 106 to receive a Session Initiation Protocol (SIP) SUBSCIRBE for retrieving the contents list from the initiator ISC client 101 for providing a contents list.

The various embodiments for retrieving the personalized contents list or the full contents list are described later in sequence diagrams of FIGS. 9, 10, 11 and 12.

At step 402a, the method 400a configures the ISC server 105 or the ISC XDMS 106, whoever receives the request for retrieving the contents list, to identify whether the request for retrieving the contents list indicates the personalized contents list or the full contents list. The UserChoice element in the SIP SUBSCRIBE request indicates the ISC user desired type of contents list. The UserChoice element whose sub-element RefName can be set by the initiator ISC client 101 to either ReferPredefinedPref, ReferOnDemandPref, or FullContentList If at step 402a, it is determined that the FullContentList is required, then at step 403a, the method 400a configures the ISC server 105 or the ISC XDMS 106 to provide the full contents list to the ISC user. If at step 402a, it is determined that the personalized contents list is required, then at step 404a, the method 400a configures the ISC server 105 or the ISC XDMS 106 to generate the personalized contents list by applying appropriate filter based on the UserChoice element whose sub-element RefName set to either the ReferPredefinedPref or the ReferOnDemandPref.

In an embodiment, the method 400a applies the user's context information (context information of the ISC user associated with the initiator ISC client 101) is applied on the full contents list to generate the personalized contents list.

Further the ISC server 105 provides the desired contents list to the ISC user. The various actions, acts, blocks, steps, and the like in method 400a may be performed in the order presented, in a different order or simultaneously. Further, in some embodiments, some actions, acts, blocks, steps, and the like may be omitted, added, modified, skipped, and the like without departing from the scope of the invention.

Figure 4B:
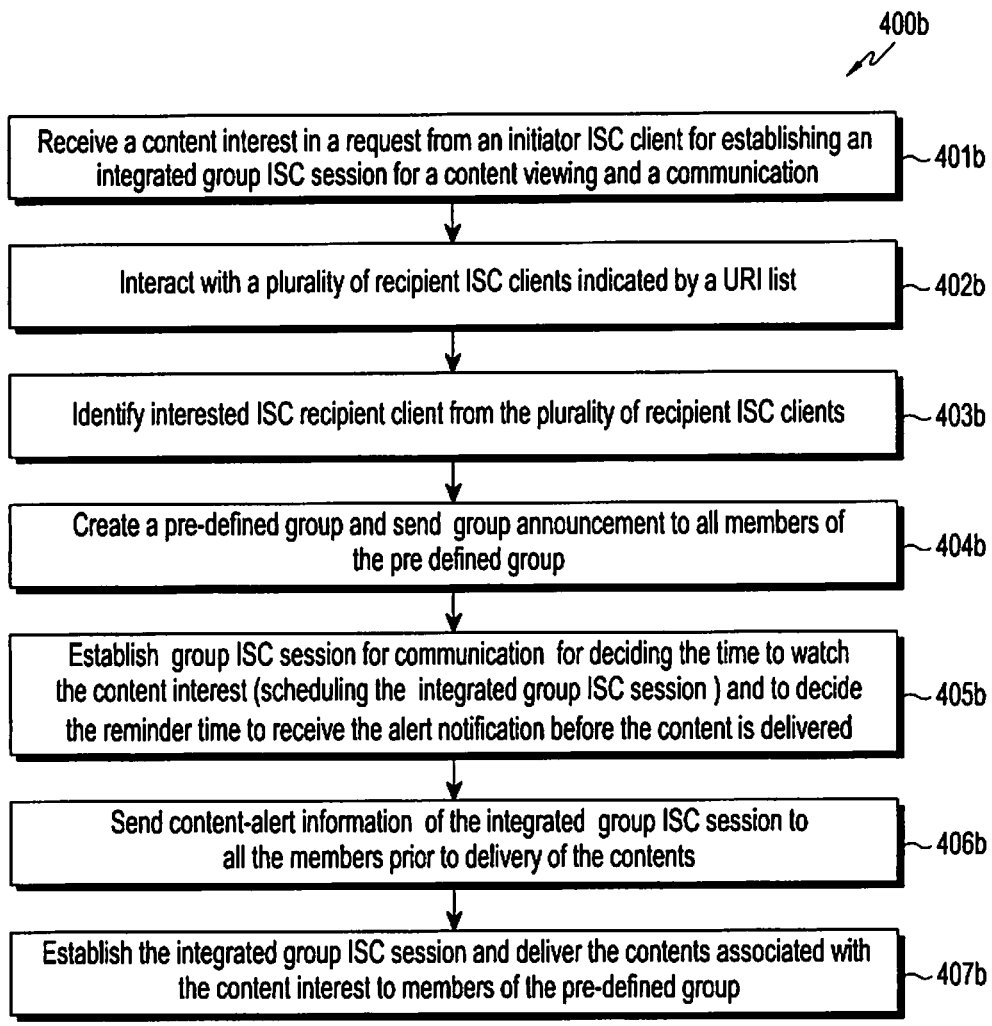
FIG. 4B is a flow diagram illustrating a method for establishing the integrated group ISC session for the content viewing and the communication for delivering content associated with the content interest selected by the ISC user from the personalized contents list or the full contents list, according to embodiments as disclosed herein.

The FIG. 4b is a flow diagram illustrating a method 400b for establishing the group ISC session for the content viewing and the communication for delivering content associated with the content interest selected by the ISC user from the personalized contents list or the full contents list, according to embodiments as disclosed herein. Upon receiving the desired contents list from the ISC server 105, the ISC user associated with the initiator ISC client can initiate the request an ISC session server to initiate the integrated group ISC session. At step 401b, the method 400b configures the ISC session server ISC server to receive a content interest in a request from the initiator ISC client 105 for establishing an integrated group ISC session for a content viewing and a communication In an embodiment the ISC session server can be the ISC server 105 receiving the request in a Session Initiation Protocol (SIP) MESSAGE. In an embodiment the ISC session server can be the presence server 109 receiving the request in a SIP PUBLISH request for the integrated group ISC session initiation. The SIP PUBLISH request allows the initiator ISC client to publish the content interest to the presence server 109. At step 402b, the method 400b configures the ISC session server to interact with the plurality of recipient ISC clients such as the recipient ISC client 102 and the recipient ISC client 103 indicated by a URI list provided by the initiator ISC client 101. At step 403b, the method 400b configures the ISC session server to identify interested ISC client, from the plurality of recipient ISC clients, desiring to participate in the integrated group ISC session initiated by the initiator ISC client 101. The steps describing interaction with the plurality of recipient ISC clients and identifying the interested ISC client are described later in sequence diagrams of FIG. 5 and FIG. 6 based on whether the request for initiation of the integrated group ISC session is received by the ISC server 105 or the ISC XDMS 106.

At step 404b, the method 400b configures the ISC server 105 to create a pre-defined group upon receiving a request from the initiator ISC client 101 and send group announcement to all the members of the pre-defined group including the interested recipient ISC clients and the initiator ISC client 101. At step 405b, the method 400b configures the ISC server 105 to establish the group ISC session for communication to allow the members of the pre-defined group to decide the time to watch the content associated interest during the integrated group ISC session. During the group ISC session for communication the participating members also decide upon the reminder time to receive a Content-alert information before the content is delivered. The steps for creation of the pre-defined group, performing group announcement and establishing the group ISC session for communication are described later in sequence diagram of FIG. 7.

At step, 406b the method 400b configures the presence server 109 to receive a SIP PUBLISH request, publishing the Content-delivery information and further notify the interested recipient ISC clients about scheduled time (StartTime) for the integrated group ISC session to be established for viewing the interested content. Further the method configures the presence server 109 to send the Content-alert information of the integrated group ISC session to all the members prior to delivery of the contents associated with the content interest, expressed by the ISC user. The Content-alert information includes but is not limited to a StartTime and a text indicating an alert notification for the integrated group ISC session. The alert notification is sent to all members of the pre-defined group based on the reminder time (ReminderTime) decided by the members of the pre-defined group. The steps for publishing the Content-delivery information and sending the Content-alert information are described later in the sequence diagram of FIG. 8.

The Content-delivery information includes a reference to the content, start time for the later delivery of the content associated with the content interest and the reminder time to receive the alert notification prior to the delivery of the content expressed by the user through the content interest. The Content-delivery information is included in the presence event package and published in the presence server using SIP PUBLISH request wherein the SIP PUBLISH body includes below as a MIME content:

ContentRef: uniquely identifies the content and indicating reference to the content to be delivered during the integrated group ISC session.SIP URI can be set as the value for ContentRef for the Video on Demand (VOD) Content and Channel Number can be set as the value for the LIVE Content.

StartTime: Indicates ISC user the time decided to watch the content.

ReminderTime: Indicates ISC user the reminder time to receive the alert notification prior to delivery of the content associated with the content interest.

At step, 407b, the method 400b configures the ISC server 105 to establish the integrated group ISC session and deliver the contents associated with the content interest to members of the pre-defined group. The various actions, acts, blocks, steps, and the like in method 400b may be performed in the order presented, in a different order or simultaneously. Further, in some embodiments, some actions, acts, blocks, steps, and the like may be omitted, added, modified, skipped, and the like without departing from the scope of the invention.

The ISCConvergenceID is an ISC specific header field. Including the ISCConvergenceID in the SIP MESSAGE request or SIP INVITE request which is globally unique identifier that indicates the ISC request and response associated with an ISC content viewing and communication, content interest. All requests and responses belonging to the same ISC content viewing and communication or the same content interest carry the same value for the ISCConvergenceID header field. Sending ISC functional component includes an ISCConvergenceID header field in each SIP MESSAGE request or SIP INVITE request that are associated with the ISC content viewing and communication, content interest. The sending ISC functional component ensures that the included ISCConvergenceID is globally unique.

The ISC Content Interest Feature Tag in the first SIP MESSAGE indicates the ISC server 105 whether the initiated ISC session is for establishing an integrated group ISC session to watch the interested content at scheduled time along with other ISC user(s). The ISC Client includes both an IMS Communication Service Identifier (ICSI) and an IMS Application Reference Identifier (IARI) feature tag in the Accept-Contact header, Contact header and P-Preferred-Service header as per [RFC3841], [RFC3840], if the ISC Server has to behave differently when it receives IARI, else the ISC Client includes only ICSI feature tag in the request.

For example CI_FT (Content Interest Feature Tag) is an ISC feature tag set to:
+g.3gpp.icsi-ref="urn%3Aurn-7%3A3gpp-service.ims.icsi.omaisc.<isc-feature>" when it is carried as a feature tag in a Contact or Accept-Contact header; and,
urn:un-7:3gpp-service.ims.icsi.oma.isc.<isc-feature> when it is carried as a URN in a P-Preferred-Service or P-Asserted-Service header as described in [3GPP TS 24.229].

The table 1 provided below describes the ISC feature tag.

TABLE 1

| ISC Session requested by ISC user | <isc-feature> (ISC feature tag) | Description |
|---|---|---|
| ISC Content Viewing and Communication Integrated Session | cv-cm = +g.3gpp.icsi-ref="urn%3Aurn-7%3A3gpp-service.ims.icsi.oma.isc.cv-cm | ICSI identifier for content viewing and communication integration session. |
| Expressing Content Interest | +g.3gpp.icsi-ref="urn%3Aurn-7%3A3gpp-service.ims.iari.oma.isc.contentinterest | This IARI identifier is used when ISC user is expressing his content interest. |

Figure 5:
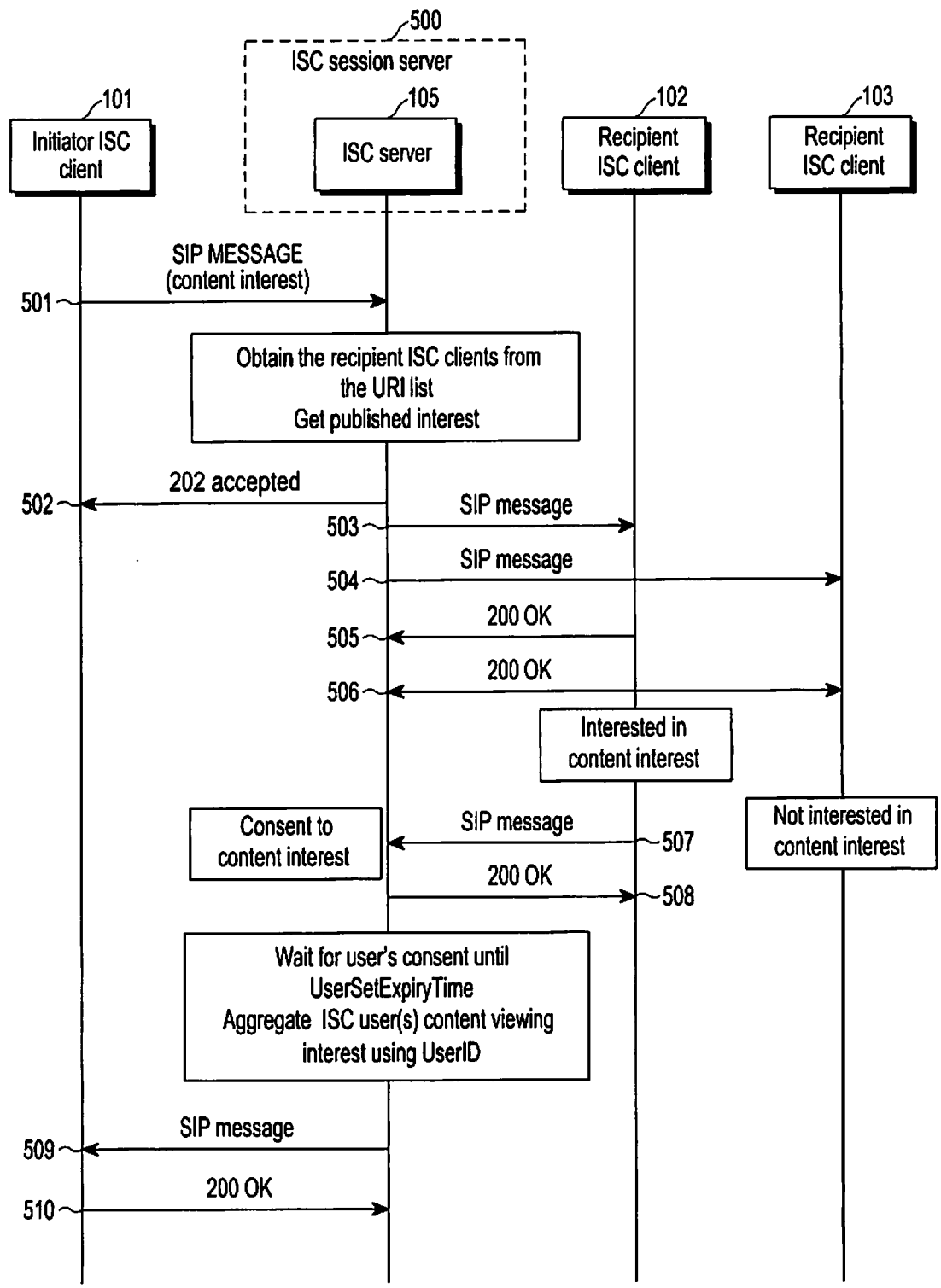
FIG. 5 is an example sequence diagram illustrating content interest selected by the ISC user to the ISC server, using a Session Initiation Protocol (SIP) MESSAGE, according to embodiments as disclosed herein.

FIG. 5 is an example sequence diagram illustrating expressing the content interest selected by the ISC user to the ISC server, using a Session Initiation Protocol (SIP) MESSAGE, according to embodiments as disclosed herein. The FIG. 5 depicts the Initiator ISC client 101, an ISC session server 500 including the ISC server 105, the recipient ISC client 102 and the recipient ISC client 103 exchanging SIP based control signal to express the ISC user's content interest to the ISC server 105 and further to the plurality of the recipient ISC clients. The ISC user associated with the initiator ISC client 101 can request initiation of the integrated group ISC session by selecting desired content from the personalized contents list or the full contents list requested prior to the request for initiation of the integrated group ISC session.

Upon receiving request from the ISC user indicating the ISC user's interest in viewing a particular content along with other ISC users, the initiator ISC client 101 generates the SIP MESSAGE request as defined in IETF RFC 3428 with the following clarifications:

1. Include the Request-URI as the ISC server address, if the content interest has to be expressed to more than one ISC users.
2. Include the ISC Feature Tag CI_FT with a value as defined in Table 1 for expressing content interest and establishing an integrated group ISC session to watch the content interest and receive the alert notification before the content is delivered to the ISC user. CI_FT with ICSI value (+g.3gpp.icsi-ref="urn %3Aurn-7%3A3gpp-service.ims.icsi.oma.isc.cv-cm) is included in Accept-Contact header field and P-Preferred-Service header field and CI_FT with IARI value (+g.3gpp.icsi-ref="urn%3Aurn-7%3A3gpp-service.ims.iari.omaIsc.contentinterest) is included in Accept-Contact header field.
3. Include URI List of the target ISC users to whom the content interest is expressed.
4. Include new Content-Type for specifying the user's content interest to be advertised to the recipient URI list "application/vnd.oma.isc.content-interest+xml".
5. Include globally unique identifier ISCConvergenceID as a header field to associate the recipient ISC user(s) consent to the content interest expressed by the ISC user.
6. Include the following in the SIP MESSAGE body under the Content-Type "application/vnd.oma.isc.content-interest+xml".
   6.1 Include the ContentRef indicating reference to the content to be delivered for the content interest during the integrated group ISC session and is unique per content
   6.2 Include the ContentName indicating the name of the content
   6.3 Include the Description indicating the description of the content
   6.4 Include the UserMessage indicating the message to the target ISC users regarding the content interest
   6.5 Include the UserSetExpiryTime indicating the expiry time until the target ISC user(s) response is expected Further, the initiator ISC client 101 stores the ISCConvergenceID locally on the device until UserSetExpiryTime lapses and sends (501) the SIP MESSAGE request towards the ISC server 105.

The ISC server 105 checks the value of ISCConvergenceID received in the SIP MESSAGE with the locally stored ISCConvergenceID values and if the value does not match with any of the locally stored ISCConvergenceIDs then the ISC Server 105 stores the value of ISCConvergenceID locally. The ISC Server 105 obtains the plurality of recipient ISC clients (the recipient ISC client 102 and 103 respectively) from the URI list received in the SIP MESSAGE request and obtains the content interest for publishing it to the obtains the plurality of recipient ISC clients (the recipient ISC client 102 and 103 respectively). Further, the ISC server 105 returns (502) 202 Accepted in response to the SIP MESSAGE request received if there are no errors to the request to the initiator ISC client 101 otherwise the ISC server 105 returns error as specified in IETF RFC 3428.

Further, the ISC server 105 forwards (503, 504) the SIP MESSAGE request to the recipient ISC client 102 and 103 respectively as specified in the URI list in the received SIP MESSAGE. The forwarded SIP MESSAGE includes the content interest and retains the same value of the ISCConvergenceID specified in the received SIP MESSAGE. Upon reception of the forwarded SIP MESSAGE, the recipient ISC clients 102 and 103 respectively return (505, 506) 200 OK in response if there are no errors to the request. Otherwise ISC server 105 returns error as specified in IETF RFC 3428. In a particular scenario in the figure, recipient ISC client 102 is interested in the content interest (provides consent for the content interest) expressed by the initiator ISC client 101 while recipient ISC client 103 is not interested in the content interest for participating in the integrated group ISC session based on the content interest.

Thus, the recipient ISC client 102 and 103 checks if the UserSetExpiryTime is lapsed or not. If not lapsed the ISC client 102 and 103 generates and sends (507) a SIP MESSAGE (response SIP MESSAGE) in response to the forwarded SIP MESSAGE request. The SIP MESSAGE from plurality of recipient ISC clients 102 and 103 respectively indicates to the ISC server 105 whether the plurality of recipient ISC clients given their consent to the integrated group ISC session for the content interest. The SIP MESSAGE response comprises the ISCConvergenceID as received in the SIP MESSAGE request, the CI_FT as specified in Table 1, and UserInterest indicating consent/response of the recipient ISC clients 102 and 103 respectively for the interested content with the value UserInterest set to either yes (interested) or no (not interested). This SIP MESSAGE response is sent towards the ISC Server 105. If the UserSetExpiryTime has lapsed and the recipient ISC User(s) has not responded until, then the recipient ISC Client(s) notifies the recipient ISC User(s) about the expired time. The ISC server 105 returns (508) a 200 OK in response to the SIP MESSAGE received from the recipient ISC clients 102 and 103 respectively if there are no errors to the request. Otherwise ISC server 105 return error as specified in IETF RFC 3428.

However, as depicted in the figure the recipient ISC client 103, which is not interested in the content interest, may not respond with the response SIP MESSAGE. Thus, the ISC server 105 waits for the ISC User(s) consent (response from the ISC user(s) associated with all corresponding recipient ISC client(s) recipient ISC client 102 and 103 respectively) until the UserSetExpiryTime lapses, aggregate and forwards the recipient ISC user(s) responses in SIP MESSAGE (509) towards the initiator ISC client 101 including each recipient ISC user(s) response in the UserID element and the corresponding sub-element UserInterest element in the MIME body.

Upon receiving the SIP MESSAGE with content interest, the initiator ISC client 101 checks the value of the ISCConvergenceID matched with the locally stored value and then extracts the UserID element(s) and its corresponding sub-element UserInterest element from the MIME body containing the Content-Type "application/vnd.omadsc.content-interest+xml"; The initiator ISC Client 101 then notifies the initiator ISC User about the content interest response from the recipient ISC Users according to the value extracted from the sub-element UserInterest of the element UserID.

The initiator ISC client 101 returns (510) a 200 OK in response to the SIP MESSAGE received from the ISC server 105 if there are no errors to the request. Otherwise ISC server 105 return error as specified in IETF RFC 3428.

Figure 6:
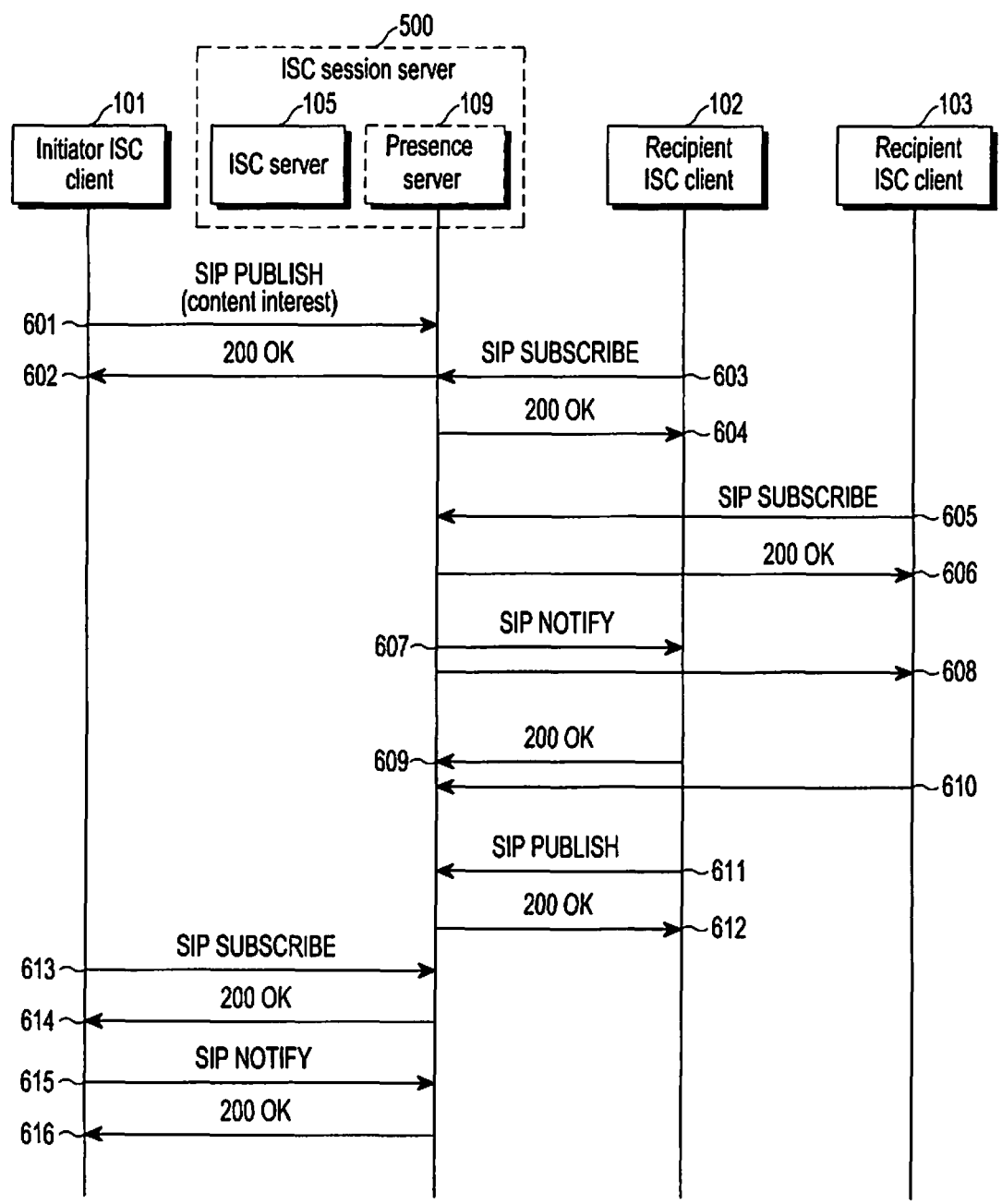
FIG. 6 is an example sequence diagram illustrating expressing the content interest selected by the ISC user, to a presence server, using a SIP PUBLISH request, according to embodiments as disclosed herein.

FIG. 6 is an example sequence diagram illustrating expressing of the content interest selected by the ISC user, to a presence server, using a SIP PUBLISH request, according to embodiments as disclosed herein. The FIG. 6 depicts the Initiator ISC client 101, the ISC session server 500 including the presence server 109 and the ISC server 105, the recipient ISC client 102 and the recipient ISC client 103 exchanging SIP based control signal to express the ISC user's content interest to the ISC server 105 and further to the plurality of the recipient ISC clients. The ISC user associated with the initiator ISC client 101 can request initiation of the integrated group ISC session by selecting desired content from the personalized contents list or the full contents list requested prior to the request for initiation of the integrated group ISC session.

Upon receiving request from the ISC user indicating the ISC user's interest in viewing a particular content, the initiator ISC client 101 generates (601) the SIP PUBLISH request to a presence event package with the content interest ("isc-content-interest") being specified in the SIP PUBLISH request body. For example:

```
PUBLISH sip:UserA@example.com SIP/2.0
    Via:SIP/2.0/UDP UserA.example.com;branch=z9hG4bK652hsge
    To: <sip:Server@example.com>
    From: <sip:UserA@example.com>;tag=1234wxyz
    Call-ID: 81818181@pua.example.com
    CSeq: 1 PUBLISH
    Max-Forwards: 70
    Expires: 3600
    Event: isc-content-interest
    Content-Type: application/vnd.oma.isc.content-interest+xml
    Content-Length: ...
    <?xml version="1.0" encoding="UTF-8"?>
    <presence
    xmlns="urn:ietf:params:xml:ns:ISCContentInterestEventPackage">
        <contentinterest>
            <ContentRef>...</ContentRef>
            <ContentName>...</ContentName>
            <Description>...</Description>
            <UserMessage>...</UserMessage>
        <UserSetExpiryTime>...</UserSetExpiryTime>
            <UserID>
            <UserInterest="yes">
            <UserInterest="no">
            </UserID>
            <ContentDeliveryInfo>
            <StartTime>...</StartTime>
        <ReminderTime>...</ReminderTime>
        </ContentDeliveryInfo>
        </contentinterest>
    </presence>
```

The ISC server 105 returns (602) 200 OK in response to the SIP PUBLISH request received if there are no errors to the request. Otherwise ISC server returns error as specified in IETF RFC 3261.

Further, the recipient ISC client 102 and 103 respectively subscribe (603, 605) to the presence event package by sending SIP SUBSCRIBE request to the ISC server 105. The ISC server returns 200 OK (604, 606) in response to the SIP SUBSCRIBE request received. For example:

```
SUBSCRIBE sip:ClientB@example.com SIP/2.0
Via: SIP/2.0/UDP host.example.com;branch=z9hG4bKnashds7
To: <sip: Server@example.com>
From: <sip:ClientB@example.com>;tag=12341234
Call-ID: 12345678@host.example.com
CSeq: 1 SUBSCRIBE
   Max-Forwards: 70
   Expires: 3600
   Event: isc-content-interest
   Contact: sip:user@host.example.com
   Content-Type: application/vnd.oma.isc.content-interest+xml;
   charset="utf-8"
      Content-Length: 0
```

Further, the presence server 109 generates (607, 608) a SIP NOTIFY (first SIP Notify) request to the recipient ISC clients 102 and 103 respectively to notify about the content interest of the initiator ISC client 101 in the presence event package. For example:

```
NOTIFY sip:Server@host.example.com SIP/2.0
   Via: SIP/2.0/UDP pa.example.com;branch=z9hG4bK8sdf2
   To: <sip:ClientB@example.com>;tag=12341234
   From: <sip:presentity@example.com>;tag=abcd1234
   Call-ID: 12345678@host.example.com
CSeq: 1 NOTIFY
   Max-Forwards: 70
   Event: isc-content-interest
   Subscription-State: active; expires=3599
   Contact: sip:pa.example.com
   Content-Type: application/vnd.oma.isc.content-interest+xml
   Content-Length: ...
<?xml version="1.0" encoding="UTF-8"?>
<presence
xmlns="urn:ietf:params:xml:ns:ISCContentInterestEventPackage"
         entity="pres:presentity@example.com">
<contentinterest>
         <ContentRef>435350-djhkj9sdn32-dfg</ContentRef>
         <ContentName>Avatar</ContentName>
         <Description>fantasy movie genre</Description>
         <UserMessage>Interested to view</UserMessage>
         <UserSetExpiryTime>3600</UserSetExpiryTime>
         <UserID> 100
         <UserInterest="yes">
         </UserID>
         <ContentDeliveryInfo>
            <StartTime>2400</StartTime>
            <ReminderTime>10</ReminderTime>
         </ContentDeliveryInfo>
      </contentinterest>
</presence>
```

The recipient ISC client 102 and 103 respectively return (609, 610) 200 OK in response to the SIP NOTIFY received. Further, if the recipient ISC client 102 receives a request from the ISC user associated with the recipient ISC client 102 indicating consent in the content interest, the recipient ISC client 102 generates and sends (611) a SIP PUBLISH request to the presence event package with "application/vnd.oma.isc.content-interest" being included in the SIP PUBLISH request body.

The ISC server returns (612) 200 OK in response to the SIP PUBLISH request received if there are no errors to the request. Further, since the recipient ISC client 103 is not interested in the content interest it does not publish presence information in the ISC server 105.

Upon the initiator ISC client 101 subscription to the presence event package, the initiator ISC client 101 generates and sends (613) a SIP SUBCRIBE request to the presence server 109 and gets notified from the presence server 109 when there is update in the presence event package. Thus, whenever any of the ISC users show interest in content interest, then the initiator ISC client 101 gets notified (615) in SIP NOTIFY from the presence server. In response to the SIP NOTIFY the initiator ISC client 101 sends (616) the 200 OK in response to the SIP NOTIFY.

Figure 7:
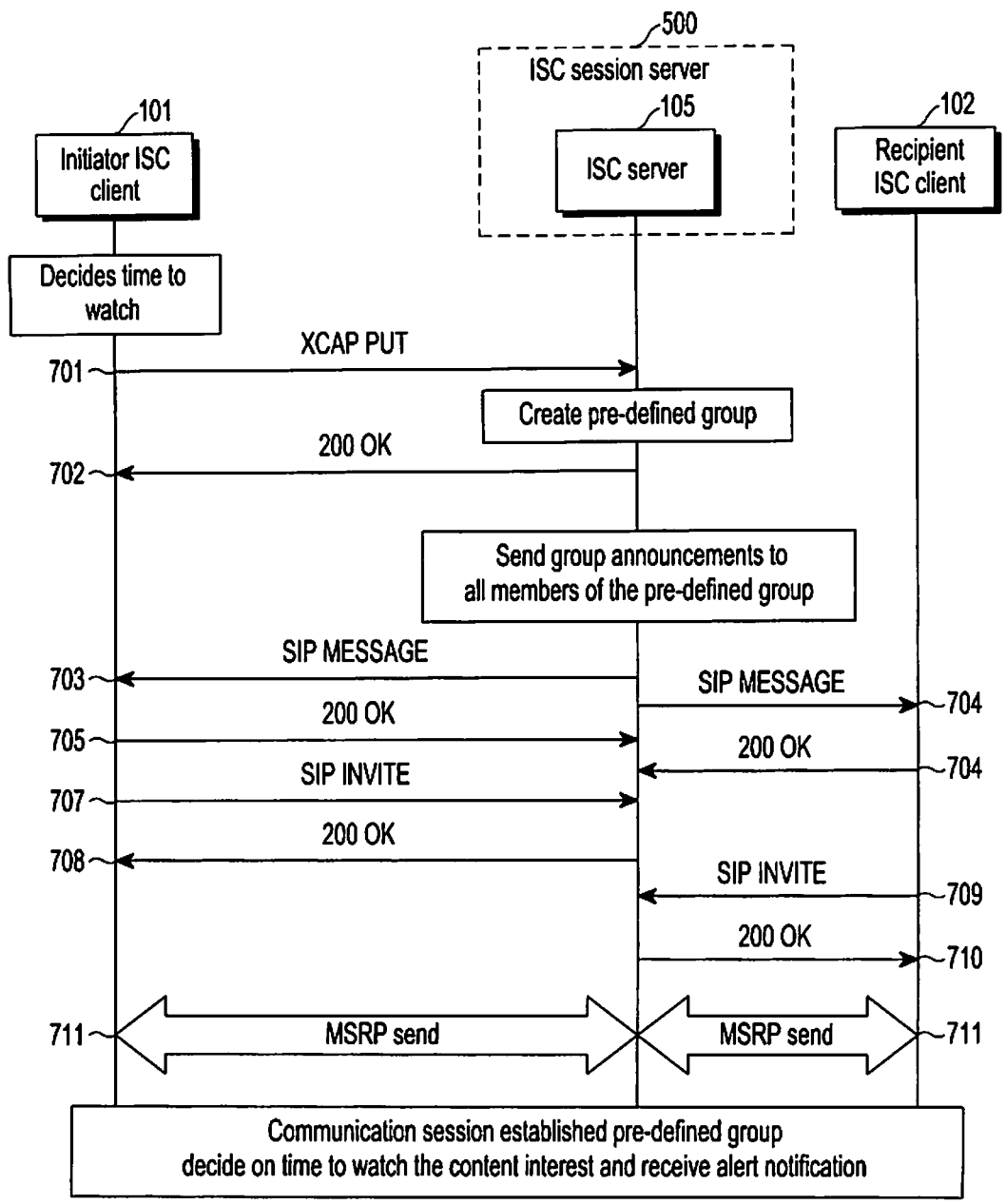
FIG. 7 is an example sequence diagram illustrating the ISC server sending group announcements to all members of a pre-defined group and allowing the members of the pre-defined group to decide on scheduling a time to watch the content associated with the content interest during the integrated group ISC session after creating the pre-defined group, according to embodiments as disclosed herein.

FIG. 7 is an example sequence diagram illustrating the ISC server sending group announcements to all the members of the pre-defined group and allowing members of the pre-defined group to decide on scheduling a time to watch the content associated with the content interest during the integrated group ISC session after creating the pre-defined group and to decide on reminder time for receiving Content-alert information, prior to the content delivered, by the ISC Server, according to embodiments as disclosed herein. With reference to FIG. 5 and FIG. 6 which enable the initiator ISC client 101 to be aware of the list of ISC users that have shown interest (Interested ISC clients) in the integrated group ISC session for viewing of the contents associated with the content interest. The FIG. 7 depicts the initiator ISC client 101, the ISC session server 500 including the ISC server 105, the recipient ISC client 102 which is the interested ISC client. After the initiator ISC client 101 decides time to watch the contents associated with the content interest during the integrated group ISC session, the initiator ISC client 101 generates and sends an XCAP PUT request to ISC server to create the pre-defined group to decide on time (schedule time) to watch the content along with the interested ISC clients. The XCAP request is generated with following clarifications:

Include the Request-URI as the ISC server address.
   Include URI List which is intended to add the ISC user(s) in the pre-defined group.
   Include pre-defined group policies The ISC server 105 obtains the plurality of recipient ISC clients from the URI list and creates the pre-defined group. Further, the ISC server returns (702) a 200 OK in the response to the XCAP PUT received if there are no errors to the request.

Once the ISC server 105 sends the 200 OK, the ISC server 105 performs group announcement to all members of the pre-defined group informing the creation of the pre-defined group. The group announcement of the newly formed group is performed through the SIP MESSAGE (703, 704) to the members and the members respond to the group announcement in the 200 OK (705, 706).

Further, for establishing the group communication session among the members for deciding the time to watch the contents associated with the content interest plurality of steps are performed. The steps including the exchange of SIP control signals such as SIP INVITE (707, 709), the 200 OK (708, 710) and the MSRP send (711) to establish the group ISC session for communication are performed as described in application 4223/CHE/2013. Upon establishment of the group ISC session for communication the members of the pre-defined group decide on time to watch the content and receive the alert notification prior to the delivery of contents associated with content interest.

Figure 8:
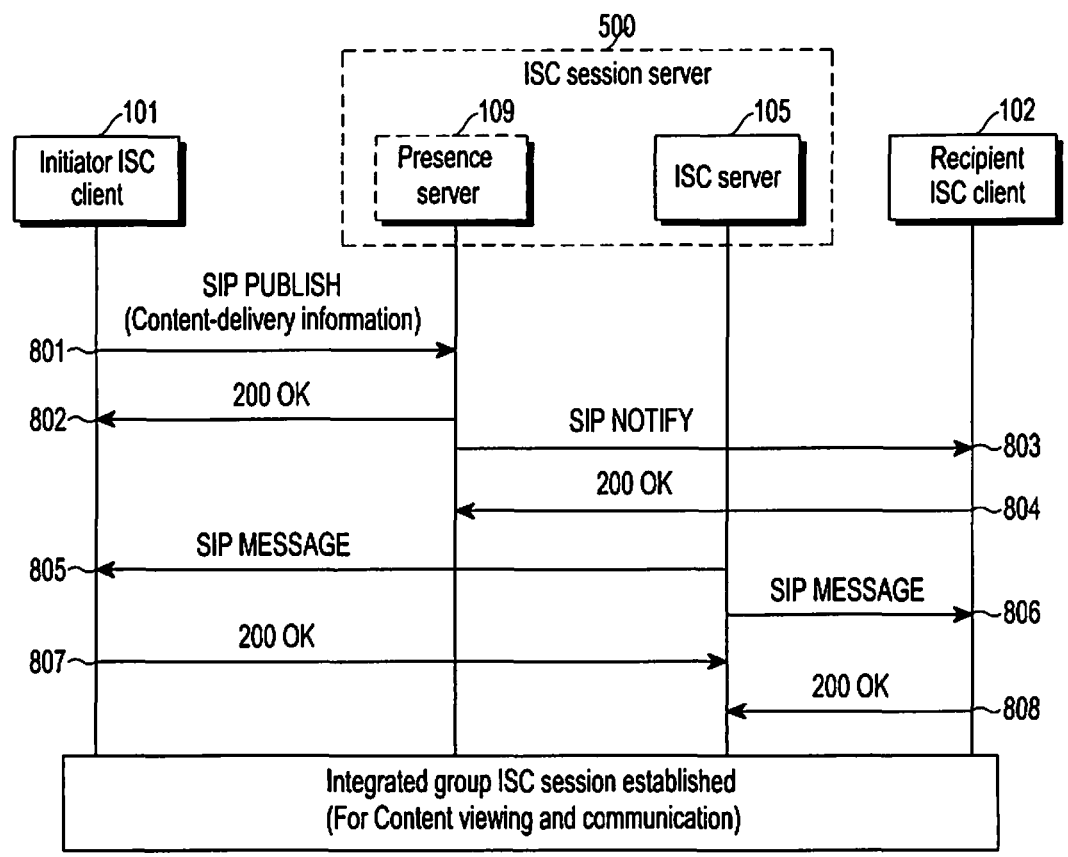
FIG. 8 is an example sequence diagram illustrating the ISC Server establishing an integrated group ISC session by sending Content alert information to all the members of the pre-defined group before the content is delivered, according to embodiments as disclosed herein.

FIG. 8 is an example sequence diagram illustrating establishing of the integrated group ISC session by sending Content alert information to the members of the pre-defined group, according to embodiments as disclosed herein. The FIG. 8 depicts the initiator ISC client 101, the ISC session server 500 including the presence server 109 and the ISC server 105, the recipient ISC client 102 which is the interested ISC client. With reference to the FIG. 7 the members of the pre-defined group have decided upon the time to watch the content collaboratively and also decided upon the time to receive the Content-alert information prior to content delivery.

Upon receiving the request from the ISC user for setting up time for later delivery of the content and for receiving the alert notification prior to the content delivery, the initiator ISC client 101 generates (801) and sends a SIP PUBLISH request with presence event package towards the presence server 109.

The SIP PUBLISH request publishes the Content-delivery information to the presence event package and the MIME body of the SIP PUBLISH request publishing the Content-delivery information indicates a StartTime, a ReminderTime and a ContentRef to the presence server 109.

The SIP PUBLISH request is sent with following additional clarifications:
1. Include the following in the SIP PUBLISH request body under new Content-Type "application/vnd.oma.isc.content-alert+xml" for publishing the Content-delivery Information
    1.1 ContentRef uniquely identities the content and indicating reference to the content to be delivered during the integrated group ISC session. SIP URI can be set as the value for ContentRef for the VOD Content and Channel Number can be set as the value for the LIVE Content.
    1.2 StartTime: Indicates ISC user the time decided to watch the content
    1.3 ReminderTime: Indicates ISC user the reminder time to receive the Content-alert information prior to content delivery associated with the content interest For example:

```
PUBLISH sip:UserA@example.com SIP/2.0
Via: SIP/2.0/UDP
UserA.example.com;branch=z9hG4bK652hsge
To: <sip:Server@example.com>
From: <sip:UserA@example.com>;tag=1234wxyz
Call-ID: 81818181@pua.example.com
CSeq: 1 PUBLISH
Max-Forwards: 70
Expires: 3600
Event: isc-content-interest
Content-Type: application/vnd.oma.isc.content-alert+xml
Content-Length: ...
    <?xml version="1.0" encoding="UTF-8"?>
    <presence xmlns="urn:ietf:params:xml:ns:isccontent-alert">
    <contentinterest>
        <ContentDeliveryAlertInfo>
            <ContentRef>435350-djhkj9sdn32-dfg</ContentRef>
            <StartTime> 21:00</StartTime>
        <ReminderTime>10</ReminderTime>
        </ContentDeliveryAlertInfo>
    </contentinterest>
```

The presence server 109 returns (802) 200 OK in response to the SIP PUBLISH request received if there are no errors to the request. Further, the presence server 109 generates and sends (803) a SIP NOTIFY (second SIP NOTIFY) to each interested ISC client. The SIP NOTIFY indicates the Content-delivery information to each interested ISC client in the pre-defined group.

The recipient ISC client 102 returns (804) 200 OK to the presence server 109 in response to SIP NOTIFY received if there are no errors to the request.

Further, after return of the 200 OK in response to the SIP NOTIFY by the presence server 109, upon lapse of the reminder time to send alert, the ISC server 105 (Contents Guide Function 301) generates and sends (805, 806) the SIP MESSAGE request for communication as defined in IETF RFC 3428 stating as "alert message from the ISC server before the content distribution starts" with the following clarifications:
  include the Request-URI as the Client A and B addresses.
  include the GroupID of the pre-defined group.
  include globally unique identifier ISCConvergenceID as received in the SIP MESSAGE request from the initiator ISC client expressing for determining the content interest.

The MIME body of the SIP MESSAGE includes the content-alert information such as StartTime, a text indicating the alert notification and the ContentRef.

Further, on reception (807, 808) of the 200 OK from the members of the pre-defined group (initiator ISC client 101 and the recipient ISC client 102) the ISC server 105 establishes the integrated group ISC session for delivering the content associated with the content interest and allow the members to communicate with each other with reference to the content being delivered.

Figure 9:
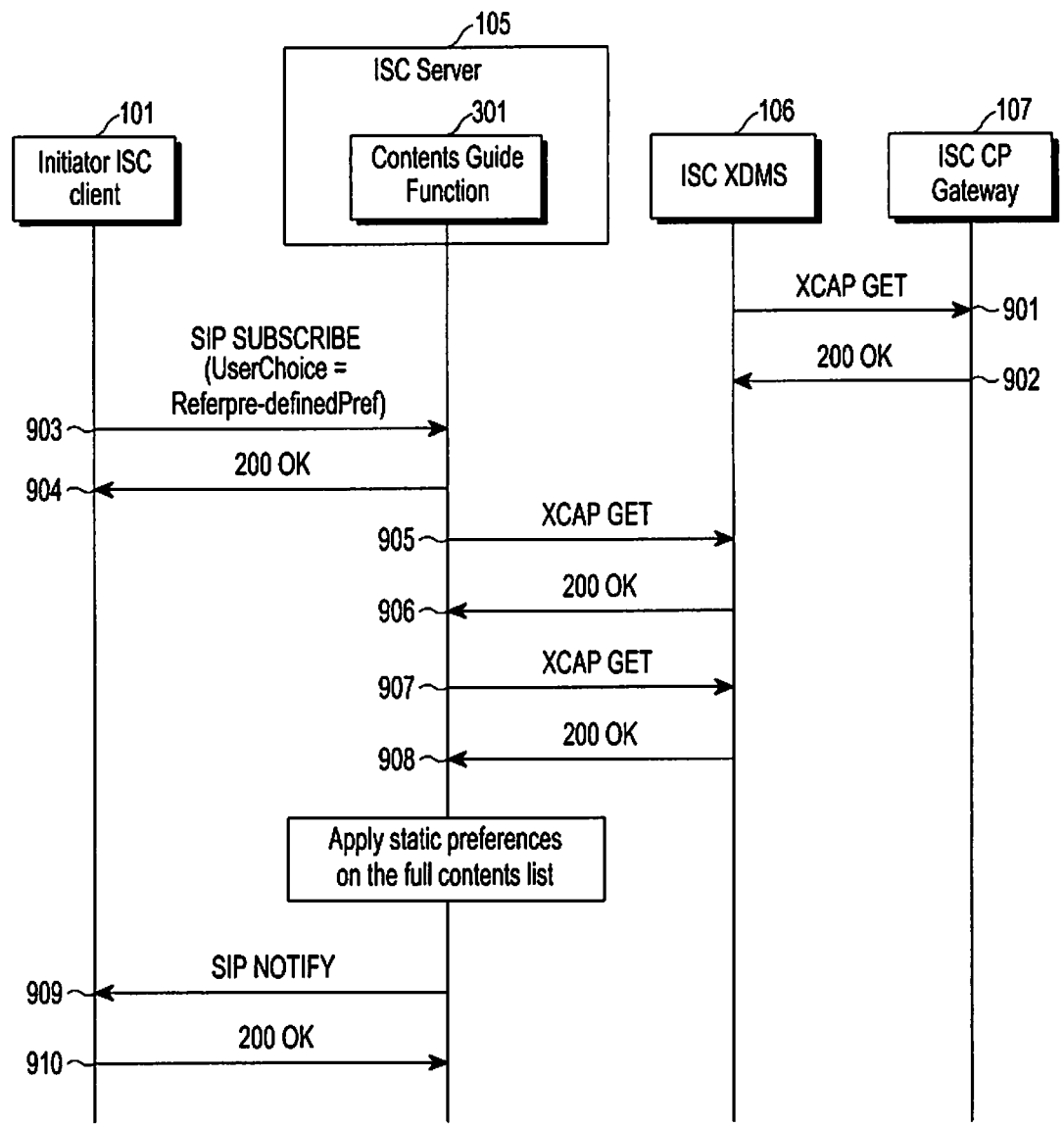
FIG. 9 is an example sequence diagram illustrating the ISC user retrieving a personalized contents list based on the ISC user's static user preferences using a Session Initiation Protocol (SIP) SUBSCRIBE request to the ISC server, according to embodiments as disclosed herein.

FIG. 9 is an example sequence diagram illustrating retrieving a personalized contents list based on static user preferences of the ISC user using a Session Initiation Protocol (SIP) SUBSCRIBE request to the ISC server, according to embodiments as disclosed herein. The FIG. 9 depicts the initiator ISC client 101, the ISC server 105 with the Contents Guide function 301, the ISC XDMS 106 and the ISC CP Gateway 107.

The ISC XDMS 106 can obtain the XML document containing the list of contents (contents list) and its associated metadata information and sends (901) an XCAP GET request to ISC CP Gateway 107, which responds (902) to the XCAP GET with 200 OK providing the full contents list in 200 OK.

However, the full contents list can be obtained by the ISC XDMS 107 using any existing method and is not limited to XCAP Get Schema for full contents list is provided, according to the embodiments as disclosed herein. The contents list schema for retrieving the full and personalized contents list from ISC XDMS and the elements are briefly described in below in table 2.

```
<Contents list>
    <ContentRef>...
        <Source> User/Non-User
            <Content Metadata>
                <ContentName>... ContentName>
                <XCAST> Multicast <XCAST>
                    <MAddr>...</MAddr>
                    <PortNo>...</PortNo>
                    <StartTime>...</StartTime>
                    <EndTime>...</EndTime>
                </XCAST>
                <Keywords>...</Keywords>
                <MediaType>...</MediaType>
                <Genre>...</Genre>
                <Rating>...</Rating>
                <URL>...</URL>
                <AspectRatio>...</AspectRatio>
                <AudioStreamType>... </AudioStreamType>
                <VideoStreamType>... </VideoStreamType>
                <UserChoice>
                    <RefName=FullContentsList>
                    <RefName=ReferPredefinedPref>
                    <RefName=ReferOnDemandPref>
                </UserChoice>
            </Content Metadata>
            <User Generated Metadata>
                <Comments> ... </Comments>
                <History> ... </History>
                <UserID> ... </UserID>
                <Ratings> ... </Ratings>
                <Bookmark>
                    <StartPosition> ... </StartPosition>
                    <EndPosition> ... </EndPosition>
                    <ContentTag> ... </ContentTag>
                </Bookmark>
                <URL> ... </URL>
```

```
        </User Generated Metadata>
    </Source>
  </ContentRef>
</Contents list>
```

| ID | Name | Description | Mandatory (M)/ Optional (O) |
|---|---|---|---|
| 1 | ContentRef | Unique Identifier for Content among the Service Providers. SIP URI can also be the value for ContentRef and Channel No can also be the value for ContentRef for the LIVE content | M |
| 2 | Source | Value of the Source can be User/Non-user. If Source is "User", then it means that Content is user generated and has user generated metadata. If the Source is "Non-user" then it means that Content is Content provider/Service provider generated content and has respected metadata information. | M |
| 3 | ContentName | Name of the content | M |
| 4 | XCAST | XCAST specifies the content is a Multicast/Unicast content. In case of Multicast content, multicast address and port no (MAddr and PortNo) are specified. In case of Unicast Content the MAddr and PortNo will not be specified. | M |
| 5 | MAddr | MAddr is Multicast address and will be present if XCAST is Multicast | M |
| 6 | PortNo | Port number of the Multicast server address | |
| 7 | Start Time | Start time of the LIVE content. StartTime field will be present only if XCAST is Multicast | M |
| 8 | End Time | End time of the LIVE content. EndTime field will be present only if XCAST is Multicast | M |
| 9 | Keywords | Keywords are associated with the content. Keywords can be user generated or Server generated | M |
| 10 | Media Type | MediaType can be Audio or Video | M |
| 11 | Aspect Ratio | Standard or High definition resolution of the content | O |
| 12 | Audio Stream Type | Audio Stream type of the content such as AC3, AAC, MPEG1 etc . . . | O |
| 13 | Video Stream Type | Video stream type of the content such as MPEG2, MPEG4 etc . . . | O |
| 14 | URL | Uniform Resource Locator to fetch the content. URL can either be generated by the server/user. | M |
| 15 | Rating | Rating for the content can be provided by the content/service provider or by the user. | M |
| 16 | Comments | Comments are generated by the user for the entire content or at particular position of the content | O |
| 17 | History | Users content viewing history of the content | O |
| 18 | User ID | Identifier for the user generated content | O |
| 19 | Bookmark | Bookmark for the content | O |
| 20 | Start Position | Starting position of the bookmarked content. This field will be present only if the content is bookmarked | O |
| 21 | End Position | End position of the bookmarked content. This field will be present only if the content is bookmarked | O |
| 22 | Content Tag | Tag for the bookmarked content for identification of bookmarked user. This field will be present only if the content is bookmarked | O |
| 23 | Genre | Identified the Genre of the content. Genre of the content can be action, comedy, drama etc . . . | M |
| 24 | UserChoice | UserChoicerefers to type of contents list document the user requires. The values the sub-element RefName can include FullContentsList, ReferPredefinedPref and ReferOnDemandPref respectively. | M |
| 25 | RefName = FullContentsList | To receive the full contents list from the server/ISC XDMS | M |
| 26 | RefName = ReferPredefinedPref | To receive the personalized contents list from the server/ISC XDMS | M |

-continued

| ID | Name | Description | Mandatory (M)/ Optional (O) |
|----|------|-------------|------------------------------|
| 27 | RefName = ReferOnDemandPref | based on the static user preferences To receive the personalized contents list from the server/ISC XDMS based on the dynamic user preferences and/or user's context information. | M |

The full Contents List can be generated by the Service Provider (SP) or offered by the Content Provider (CP) Full Contents List schema. The SP can receive the list of contents from all the CP's they are associated with and form a Full Contents List for their subscribed user. The Full Contents List contains list of all contents provided by the SP.

This Full Contents List Schema is not exhaustive. It can also include more information provided by either SP or CP such as offers and so on.ET.

Further, the initiator ISC client 101 creates a Contents-list event package which can be specified in new Content-Type in HTTP GET header.

For example,

```
    GET /Contents-list/users/sip:joebloggs@example.com/index
    HTTP/1.1
Host: xcap.example.com
User-Agent: XDM-client/OMA2.1
Date: Mon, 08 Jan 2007 10:50:33 GMT
X-3GPP-Intended-Identity: "sip:joebloggs@example.com"
Accept-Encoding: gzip
HTTP/1.1 200 OK
Server: XDM-serv/OMA2.1
Date: Mon, 08 Jan 2007 10:50:39 GMT
Etag: "eti87"
Content-Type: application/Contents-lists+xml; charset="utf-8"
Content-Length: (...)
<?xml version="1.0" encoding="UTF-8"?>
<Contents-listsxmlns="urn:ietf:params:xml:ns:Contents-lists">
    <ContentRef> 12345
        <Source> Non-User
        <Content Metadata>
            <Content Name>Expendables</Content Name>
            <XCAST> Multicast
                <Maddr>aaa.bbb.ccc.ddd</Maddr>
                <PortNo> xx <PortNo>
                <Start Time> 18.00 </Start time>
                <End Time> 20.00 </End Time>
            </XCAST>
            <Keywords>Sylvester Stallone, Bruce Willis, Jason Statham</Keywords>
            <MediaType>Video</Media Type>
            <Genre> Action </Genre>
            <Aspect Ratio> HD </Aspect Ratio>
            <Audio Stream Type> AAC </Audio Stream Type>
            <Video Stream Type> MPEG4 </Video Stream Type>
            <UserChoice>
                <RefName=FullContentsList>
                <RefName=ReferPredefinedPref>
                <RefName=ReferOnDemandPref>
            </UserChoice>
        </Content Metadata>
        </Source>
    </ContentRef>
    <ContentRef> 12346
        <Source>
        <Content Metadata>
            <Content Name> Avatar </Content Name>
            <XCAST> Multicast
                <Maddr> aa.bb.cc.dd </Maddr>
                <PortNo> xx <PortNo>
                <Start Time> 20.15 </Start time>
                <End Time> 22.15 </End Time>
            </XCAST>
            <Keywords>James Cameron, Zoe Saldana Stallone,
        </Keywords>
            <MediaType>Video</Media Type>
            <Genre>Fantasy</Genre>
            <Aspect Ratio> HD </Aspect Ratio>
            <Audio Stream Type> AAC </Audio Stream Type>
            <Video Stream Type> MPEG4 </Video Stream Type>
            <UserChoice>
                <RefName=FullContentsList>
                <RefName=ReferPredefinedPref>
                <RefName=ReferOnDemandPref>
            </UserChoice>
        </Content Metadata>
        </Source>
    </ContentRef>
</Contents-lists>
```

Further, the initiator ISC client 101 subscribes (903) to the Contents-list event package whose schema is described above by sending SIP SUBSCRIBE request and specifying the <UserChoice: RefName=> in the xml body.

The UserChoice element set to ReferPredefinedPref indicates that the ISC user has requested the personalized contents list with static preferences that the ISC user has pre-defined in the ISC server 105. The ISC server 105 sends (904) the 200 OK. The contents guide function 301 parses the value of "UserChoice: RefName" element and refers the value with Full Contents list schema to provide the type of contents list to the ISC user has requested. In this scenario the contents guide function 301 has to provide the personalized contents list to the user according to the pre-defined preferences stated by the user. Also the "Expires" header field value is "Zero" in the SIP SUBSCRIBE request stating to fetch the contents list only once by SIP SUBSCRIBE request.

For example,

```
SUBSCRIBE sip:joe.bloggs@example.com;auid=org.openmobilealliance.groups
    SIP/2.0
Via: SIP/2.0/UDP
    [5555::aaa:bbb:ccc:ddd]:1357;comp=sigcomp;branch=z9hG4bKnashds7
Route: <sip:pcscf1.visited1.net:7531;lr;comp=sigcomp>,
    <sip:orig@scscf1.home1.net;lr>
From: <sip:joe.bloggs@example.com>;tag=31415
To: <sip:joe.bloggs@example.com>
Event: SUBSCRIBE
Call-ID: b89rjhnedlrfjflslj40a222
```

```
CSeq: 85 SUBSCRIBE
P-Preferred-Identity: "Joe Bloggs" <sip:joe.bloggs@example.com>
Expires: 0
Contact: <sip:[5555::aaa:bbb:ccc:ddd]:1357;comp=sigcomp>
Content-Type: application/Contents-lists+xml; charset="utf-8"
Content-Length: (..)
<?xml version="1.0" encoding="UTF-8"?>
<Contents-list xmlns="urn:ietf:params:xml:ns:Contents-lists">
    <UserChoice>
        <RefName=ReferPredefinedPref>
    </UserChoice>
</Contents-list>
```

Further, the contents guide function 301, to obtain the Contents-list XDM document, sends (905) an XCAP GET request to ISC XDMS 106 and receives (906) the full Contents-list XML document in 200 OK. Further, contents guide function 301 obtains the User-Preferences XDM document by purpose sending (907) the XCAP GET request to the ISC XDMS 106 and receives the user preferences XML document in 200 OK. For example, the initiator ISC client 101 has sets preferences "Action" in "Genre" element. The when User-Preferences XDM document is already created for initiator ISC client 101 in the ISC XDMS 106. The contents guide function 301 in the ISC server 105 on receiving (908) the Contents-list XDM document and User-Preferences XDM document in the 200 OK applies pre-defined user preferences of the imitator ISC client 101 to the Contents-list XDM document (full contents list) and notifies (909) the personalized contents list to theimitator ISC client 101 through the SIP NOTIFY. For example,

```
HTTP/1.1 200 OK
Server: XDM-serv/OMA2.1
Date: Mon, 08 Jan 2007 10:50:39 GMT
Etag: "eti87"
Content-Type: application/Contents-lists+xml; charset="utf-8"
Content-Length: (...)
<?xml version="1.0" encoding="UTF-8"?>
<Contents-listsxmlns="urn:ietf:params:xml:ns:Contents-lists">
    <ContentRef> 12345
        <Source> Non-User
            <Content Metadata>
                <Content Name>Expendables</Content Name>
                <XCAST> Multicast
                    <Maddr>aaa.bbb.ccc.ddd</Maddr>
                    <PortNo> xx <PortNo>
                    <Start Time> 18.00 </Start time>
                    <End Time> 20.00 </End Time>
                </XCAST>
                <Keywords>Sylvester Stallone, Bruce Willis, Jason Statham</Keywords>
                <MediaType>Video</Media Type>
                <Genre> Action </Genre>
                <Aspect Ratio> HD </Aspect Ratio>
                <Audio Stream Type> AAC </Audio Stream Type>
```

-continued

```
                <Video Stream Type> MPEG4 </Video Stream Type>
                <UserChoice>
                    <RefName=FullContentsList>
                    <RefName=ReferPredefinedPref>
                    <RefName=ReferOnDemandPref>
                </UserChoice>
            </Content Metadata>
        </Source>
    </ContentRef>
</Contents-lists>
```

Figure 10:
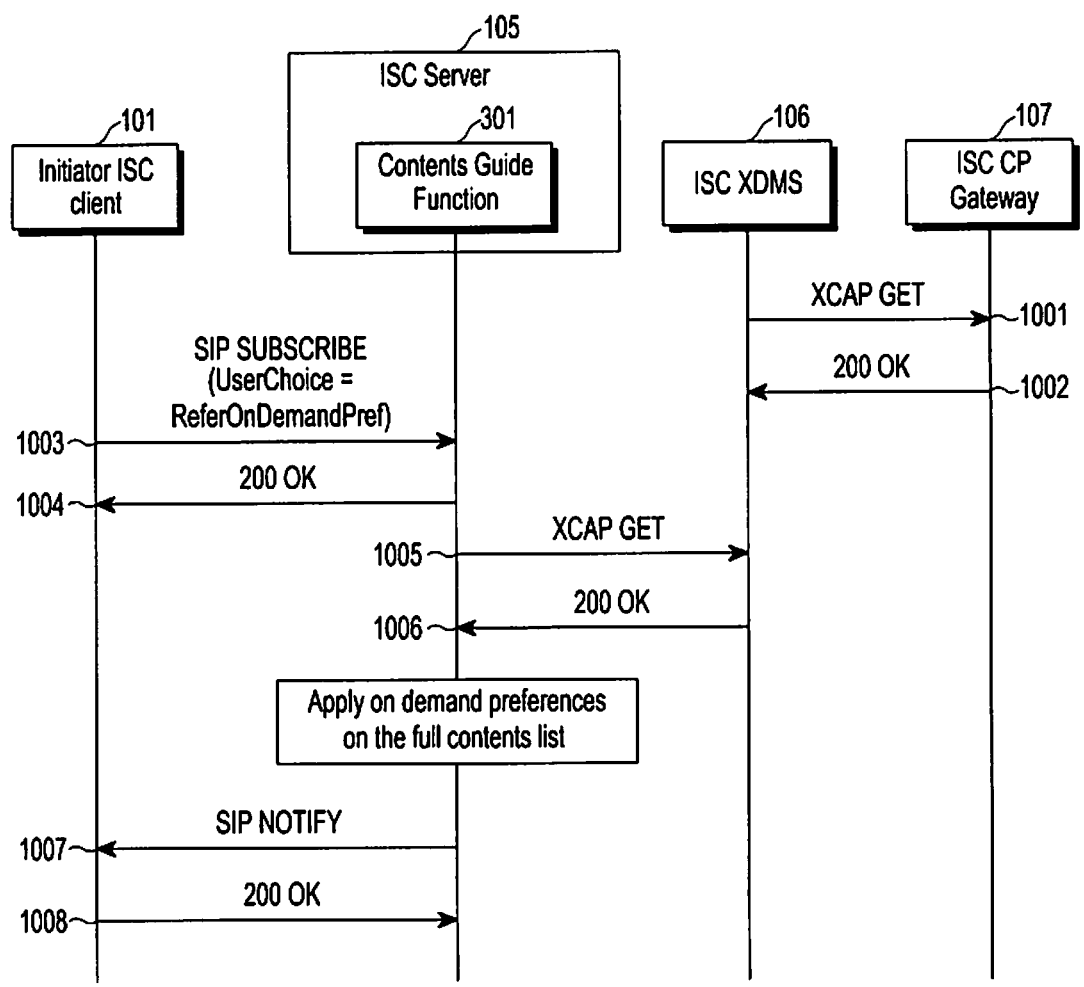
FIG. 10 is an example sequence diagram illustrating the ISC user retrieving a personalized contents list based on his on-demand user preferences using the SIP SUBSCRIBE request to the ISC server, according to embodiments as disclosed herein.

FIG. 10 is an example sequence diagram illustrating retrieving a personalized contents list based on demand user preferences of the ISC user using the SIP SUBSCRIBE, according to embodiments as disclosed herein. The FIG. 10 depicts the initiator ISC client 101, the ISC server 105 with the contents guide function 301, the ISC XDMS 106 and the ISC CP Gateway 107.

The steps 1001, 1002, 1003, 1004, 1005 and 1006 for obtaining the full contents list by the contents guide function 301 from the ISC XDMS 106 on receiving the subscription to Content-list event package from the initiator ISC client 101 are similar to steps 902 to 906 respectively and are not repeated for brevity. However, the initiator ISC client generates and sends (1003) the SIP SUBSCRIBE request similar to step 901 with the UserChoice element set to on demand preferences (ReferOnDemandPref) as requested by the ISC user.

<UserChoice: RefName=ReferOnDemandPref>.

The body of the SIP SUBSCIBE further includes the on demand preferences of the ISC user along with the context information of the user (user context information) such as history of content watched by the ISC user The contents guide function 301 parses the value of "UserChoice: RefName" element and refers the value with Full Contents list schema to provide the type of contents list to the user. In this scenario the contents guide function 301 has to provide the Personalized Contents List to the user according to the pre-defined preferences stated by the user. For example,

```
SUBSCRIBE sip:joe.bloggs@example.com;auid=org.openmobilealliance.groups
    SIP/2.0
Via: SIP/2.0/UDP
    [5555::aaa:bbb:ccc:ddd]:1357;comp=sigcomp;branch=z9hG4bKnashds7
Route: <sip:pcscf1.visited1.net:7531;lr;comp=sigcomp>,
    <sip:orig@scscf1.home1.net;lr>
From: <sip:joe.bloggs@example.com>;tag=31415
To: <sip:joe.bloggs@example.com>
Event: SUBSCRIBE
Call-ID: b89rjhnedlrfjflslj40a222
CSeq: 85 SUBSCRIBE
P-Preferred-Identity: "Joe Bloggs" <sip:joe.bloggs@example.com>
```

```
Expires: 600000
Contact: <sip:[5555::aaa:bbb:ccc:ddd]:1357;comp=sigcomp>
Content-Type: application/Contents-lists+xml; charset="utf-8"
Content-Length: (..)
<?xml version="1.0" encoding="UTF-8"?>
<Contents-list xmlns="urn:ietf:params:xml:ns:Contents-lists">
    <UserChoice>
        <RefName=ReferOnDemandPref>
    </UserChoice>
    <Content Name>Expendables</Content Name>
    <Genre> Action </Genre>
    <Aspect Ratio> HD </Aspect Ratio>
</Contents-list>
```

On receiving the full contents list form the ISC XDMS 106 at step 1006, the contents guide function 301 of the ISC server 105 applies the on demand user preferences (ReferOnDemandPref) which is received by the ISC server 105 at step 1003 in the body of the SIP SUBSCRIBE request.

Further, the contents guide function notifies (1007) the personalized contents list based on ReferOnDemandPref to the imitator ISC client 101 through SIP NOTIFY (third SIP NOTIFY).

For example,

```
HTTP/1.1 200 OK
Server: XDM-serv/OMA2.1
Date: Mon, 08 Jan 2007 10:50:39 GMT
Etag: "eti87"
Content-Type: application/Contents-lists+xml; charset="utf-8"
Content-Length: (...)
<?xml version="1.0" encoding="UTF-8"?>
<Contents-listsxmlns="urn:ietf:params:xml:ns:Contents-lists">
    <ContentRef> 12345
        <Source> Non-User
            <Content Metadata>
                <Content Name>Expendables</Content Name>
                <XCAST> Multicast
                    <Maddr>aaa.bbb.ccc.ddd</Maddr>
                    <PortNo> xx <PortNo>
                    <Start Time> 18.00 </Start time>
                    <End Time> 20.00 </End Time>
                </XCAST>
                <Keywords>Sylvester Stallone, Bruce Willis, Jason Statham</Keywords>
                <MediaType>Video</Media Type>
                <Genre> Action </Genre>
                <Aspect Ratio> HD </Aspect Ratio>
                <Audio Stream Type> AAC </Audio Stream Type>
                <Video Stream Type> MPEG4 </Video Stream Type>
                <UserChoice>
                    <RefName=FullContentsList>
                    <RefName=ReferPredefinedPref>
                    <RefName=ReferOnDemandPref>
                </UserChoice>
            </Content Metadata>
        </Source>
    </ContentRef>
</Contents-lists>
```

Further, the initiator ISC client 101 send (1008) the 200 OK in response to the SIP NOTIFY.

In an embodiment, in case the ISC user requests for the full contents list the initiator ISC client 101 generates and sends the SIP SUBSCRIBE with <UserChoice: RefName=FullContentsList>

In such scenario the full contents list obtained by the ISC server 105 from the ISC XDMS 106 and forwarded to the initiator ISC client 101 without applying any filter for user preferences.

In another embodiment, the initiator ISC client 101 can directly send a request to retrieve the full contents list by generating and sending the XCAP GET request to the ISC XDMS 106*r* and receives the full Contents-list XDM document in 200 OK.

In an embodiment, the personalized contents list can be requested directly to the ISC XDMS 106 by the initiator ISC client 101 through an XQUERY by specifying the XQUERY filter as user preferences. For example, to obtain the personalized contents list with "Genre" as "Action" and "AspectRatio" as "HD" the initiator ISC client 101 sends the XQUERY (HTTP POST) request to the ISC XDMS 106. The search is targeted at the home domain only.

For example,

```
POST /org.openmobilealliance.search?target=org.openmobilealliance.contents-
    list/users/ HTTP/1.1
Host: xcap.example.com
User-Agent: XDM-client/OMA2.1
Date: Thu, 10 Aug 2006 10:50:33 GMT
X-3GPP-Intended-Identity: "sip:joebloggs@example.com"
Accept-Encoding: gzip
Content-Type: application/vnd.oma.search+xml; charset="utf-8"
Content-Length: ...
<?xml version="1.0" encoding="UTF-8"?>
<search-set  xmlns="urn:oma:xml:xdm:search">
<search id="1234">
    <request>
<query>
    <![CDATA[
xquery version "1.0";
        declare default element namespace "urn:oma:xml:xdm:Contents-list";
            for $u in collection("org.openmobilealliance.Contents-list/users/")/Contents-list
        where ($u/Genre="Action")and($u/Aspect Ratio="HD")
```

```
            return <Contents-list>{$u/@uri}{$u/Content Name}</Contents-list>
    ]]>
</query>
        </request>
</search>
</search-set>
```

The ISC XDMS 106 performs the search operation and sends an HTTP "200 OK" response including the requested results in the body.

For example,

```
    HTTP/1.1 200 OK
Server: XDM-serv/OMA2.1
Date: Thu, 10 Aug 2006 10:50:39 GMT
Content-Type: application/vnd.oma.search+xml; charset="utf-8"
Content-Length: (...)
<?xml version="1.0" encoding="UTF-8"?>
<search-set xmlns="urn:oma:xml:xdm:search" xmlns:up="urn:oma:xml:xdm:Contents-
       list">
<search id="1234">
    <response>
      <up:Contents-list
      uri="A@example.com"><up:ContentName>Expendables</up:Contentname></up:C
      ontents-list>
      </response>
</search>
</search-set>
```

In an embodiment, the initiator ISC client can request for retrieving the personalized contents list through the XCAP GET request towards the ISC XDMS 106 with user preferences in a REQUEST URI. The search is targeted at the home domain only. Further, the ISC XDMS 106 performs the search operation and sends an HTTP "200 OK" response including the requested results in the body.

For example,

```
    HTTP/1.1 200 OK
Server: XDM-serv/OMA2.1
Date: Mon, 08 Jan 2007 10:50:39 GMT
Etag: "eti87"
Content-Type: application/Contents-lists+xml; charset="utf-8"
Content-Length: (...)
<?xml version="1.0" encoding="UTF-8"?>
<Contents-listsxmlns="urn:ietf:params:xml:ns:Contents-lists">
    <ContentRef> 12345
        <Source> Non-User
            <Content Metadata>
                <Content Name>Expendables</Content Name>
                <XCAST> Multicast
                    <Maddr>aaa.bbb.ccc.ddd</Maddr>
                    <PortNo> xx <PortNo>
                    <Start Time> 18.00 </Start time>
                    <End Time> 20.00 </End Time>
                </XCAST>
                <Keywords>Sylvester Stallone, Bruce Willis, Jason
Statham</Keywords>
                <MediaType>Video</Media Type>
                <Genre> Action </Genre>
                <Aspect Ratio> HD </Aspect Ratio>
```

-continued

```
                <Audio Stream Type> AAC </Audio Stream Type>
                <Video Stream Type> MPEG4 </Video Stream Type>
                <UserChoice>
                    <RefName=FullContentsList>
                    <RefName=ReferPredefinedPref>
                    <RefName=ReferOnDemandPref>
                </UserChoice>
            </Content Metadata>
        </Source>
    </ContentRef>
</Contents-lists>
```

Figure 11:
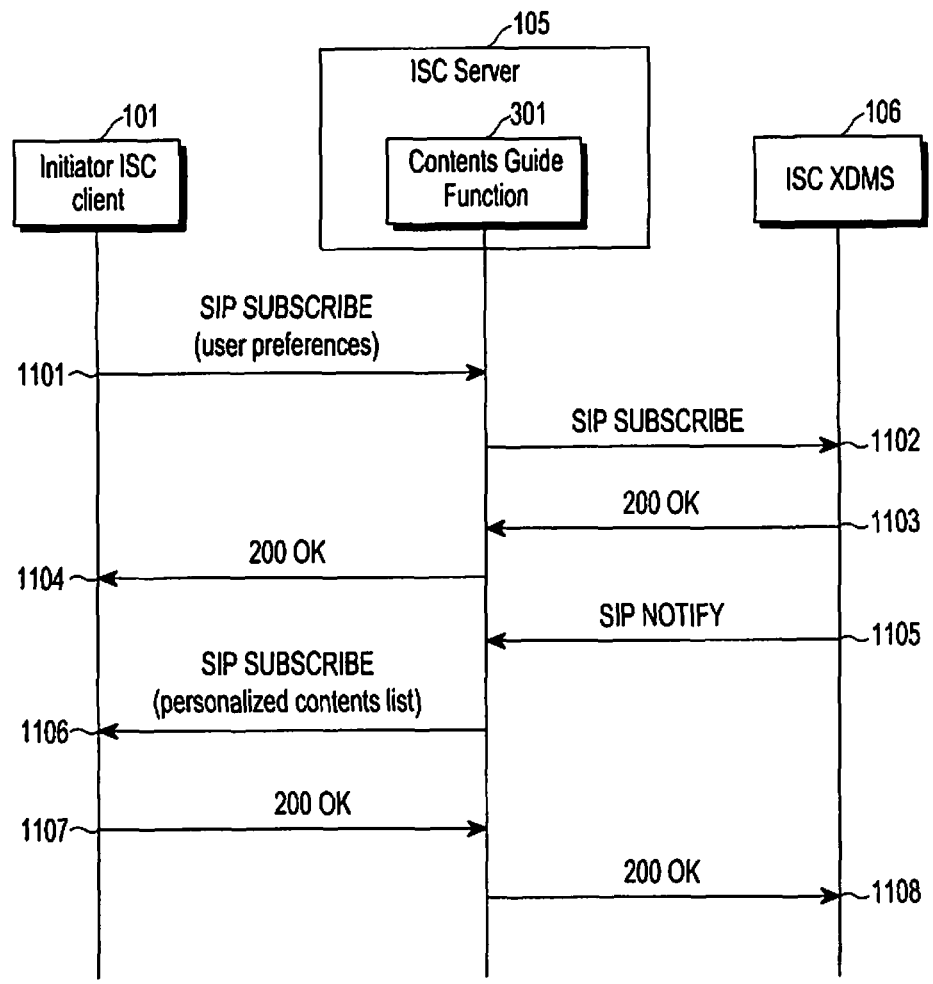
FIG. 11 is an example sequence diagram illustrating synchronization of the contents list using a contents guide function of the ISC server, according to the embodiments as disclosed herein.

FIG. 11 is an example sequence diagram illustrating synchronization of the contents list using a contents guide function of the ISC server, according to the embodiments as disclosed herein, according to embodiments as disclosed herein. The FIG. 11 depicts the initiator ISC client 101, the ISC server 105 with the contents guide function 301 and the ISC XDMS 106.

The initiator ISC client 101 generates and sends (1101) the SIP SUBSCRIBE request with user preferences specified by xcap-diff-Content-list event package, diff-processing= aggregate to the contents guide function 301 of the ISC server 105. For example, the initiator ISC client ("sip: joebloggs@example.com") subscribes to the Contents-list event package with contact SIP URI "sip: joebloggs@example.com" since the ISC user wants the contents list to be updated by sending the SIP SUBSCRIBE request to the contents guide function 301. For example,

```
    SUBSCRIBE sip:joe.bloggs@example.com;auid=org.openmobilealliance.groups
      SIP/2.0
Via: SIP/2.0/UDP
      [5555::aaa:bbb:ccc:ddd]:1357;comp=sigcomp;branch=z9hG4bKnashds7
Max-Forwards: 70
Route: <sip:pcscf1.visited1.net:7531;lr;comp=sigcomp>,
```

```
<sip:orig@scscf1.home1.net;lr>
From: <sip:joe.bloggs@example.com>;tag=31415
To: <sip:joe.bloggs@example.com>
Event: xcap-diff
Call-ID: b89rjhnedlrfjflslj40a222
CSeq: 85 SUBSCRIBE
P-Preferred-Identity: "Joe Bloggs" <sip:joe.bloggs@example.com>
Privacy: none
Expires: 600000
Accept: application/xcap-diff+xml
Contact: <sip:[5555::aaa:bbb:ccc:ddd]:1357;comp=sigcomp>
Content-Type: application/Contents-lists+xml; charset="utf-8"
Content-Length: ..
<?xml version="1.0" encoding="UTF-8"?>
<Contents-list xmlns="urn:ietf:params:xml:ns:Contents-lists">
<entry
    uri="org.openmobilealliance.groups/users/sip:joe.bloggs@example.com/Contents-
    list"/>
</Contents-list>
```

Further, the contents guide function 301 forwards (11020 the initiator ISC client's 101 ("sip:joebloggs@example.com") SIP SUBSCRIBE request to the ISC XDMS 106. Further, the ISC XDMS 106 performs the necessary authorization checks on the request originator, the ISC XDMS sends (1103) HTTP "200 OK" response including the requested document in the body. The contents guide function 301 forwards (1104) the "200 OK response to the originator (initiator ISC client 101) of the SIP SUBSCRIBE request "sip:joe.bloggs@example.com". Further, the ISC XDMS 106 generates and sends (1105) an initial SIP NOTIFY containing the initial references to the XDM document (aggregated differences in the contents list).

For example,

```
NOTIFY sip:[5555::aaa:bbb:ccc:ddd]:1357;comp=sigcomp SIP/2.0
Via: SIP/2.0/UDP cpgw.home1.net;branch=z9hG4bK332b23.1
Max-Forwards: 70
Route: <sip:scscf1.home1.net;lr>, <sip:pcscf1.visited1.net:7531;lr;comp=sigcomp>
From: <sip:joe.bloggs@example.com>;tag=31415
To: <sip:joe.bloggs@example.com>;tag=151170
Call-ID: b89rjhnedlrfjflslj40a222
CSeq: 102 NOTIFY
Subscription-State: active;expires=600000
Event: xcap-diff
Content-Type: application/xcap-diff+xml; charset="utf-8"
Contact: <sip:cpgw.home1.net>
Content-Length: (...)
<?xml version="1.0" encoding="UTF-8"?>
<xcap-diff xmlns="urn:ietf:params:xml:ns:xcap-diff"
xcap-root="http://xcap.example.com/"
<document new-etag="7ahggs"
    sel="org.openmobilealliance.groups/users/sip:joe.bloggs@example.com/contents-
    list"/>
</xcap-diff>
```

Further, the contents guide function 301 forwards (1106) the SIP NOTIFY request to the initiator ISC client 101 with the aggregated differences (personalized contents list as requested).

If the ISC XDMC does not have local copies of the XDM document it may retrieve as required.

Further, the initiator ISC client responds (1107) to the received SIP NOTIFY with the 200 OK. Further, the contents guide function 301 forwards (1108) the 200 OK to the ISC XDMS 106.

Figure 12:
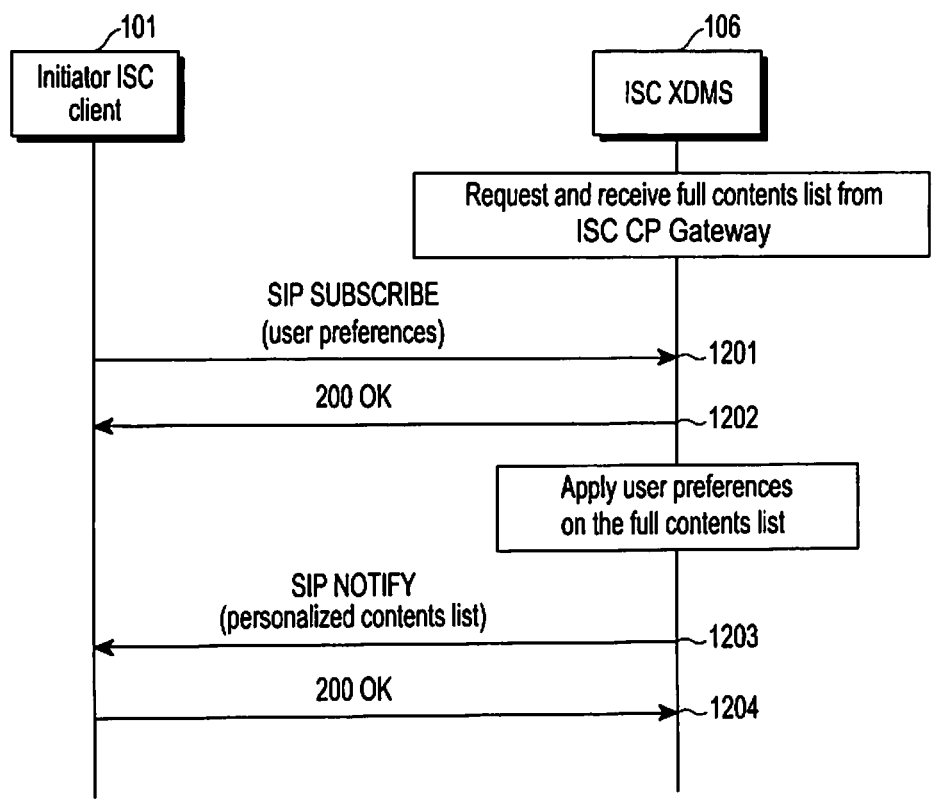
FIG. 12 is an example sequence diagram illustrating the ISC user retrieving personalized contents list based on on-demand user preferences and user's context information using SIP SUBSCRIBE request to a ISC XML Document Management Server (XDMS), according to embodiments as disclosed herein.

FIG. 12 is an example sequence diagram illustrating retrieving the personalized contents list based on on-demand user preferences and/or ISC user's context information using SIP SUBSCRIBE request, according to the embodiments as disclosed herein, according to embodiments as disclosed herein. The FIG. 12 depicts the initiator ISC client 101, and the ISC XDMS 106. The ISC XDMS 106 has already received the full contents list from the ISC CP Gateway 107 by using any existing contents list retrieval protocols as defined in the OMA standard. It is also assumed that the ISC XDMS 106 has subscribed for receiving the updates from the ISC CP Gateway in Contents List.

Upon receiving the request from the ISC user to receive the personalized contents list, the initiator ISC client 101 subscribes to the xcap-diff event package, generates and sends (1201) a SIP SUBSCRIBE request towards the ISC XDMS 106 with following clarifications:

- Include XUI address of the ISC user as the Request-URI
- Include the ISC Feature Tag CV_FT with a value as defined in Table 1 for establishing ISC content viewing and communication integrated session. CV_FT with ICSI value (+g.3gpp.icsi-ref="urn%3Aurn-7%3A3gpp-service.ims.icsi.oma.isc.cv-cm) is included in Accept-Contact header field, Contact header field and P-Preferred-Service header field.
- Include xcap-diff in the Event header field
- Include zero value in the Expires header field to receive the contents list document only one, else include non-zero value.

Include the ISC user preferences and/or ISC user's context information in the MIME body of SIP SUBSCRIBE request as below:

Include ReferOnDemandPref in the sub-element RefName of the UserChoice element to retrieve the personalized contents list. ReferOnDemandPref is used as the type of Contents List to be retrieved from the ISC XDMS. The ISC user preferences can be included based on elements in the contents list structure and the ISC user's context information can be based on user's viewed or viewing content.

After the ISC XDMS 106 receives the SIP SUBSCRIBE request, performs the necessary authorization checks on the request originator (initiator ISC client 101) and sends (1202) the 200 OK response towards the initiator ISC client. Further, on receiving the SIP SUBSCRIBE request from the initiator ISC client, the ISC XDMS 106 checks the SIP SUBSCRIBE request carrying user preferences and/or user's context information in its body and identifies UserChoice element whose sub-element RefName carries value FullContentsList or ReferOnDemandPref. If the SIP SUBSCRIBE request carries the UserChoice element whose sub-element RefName value is ReferOnDemandPref, then the ISC XDMS 106 applies the user preferences and/or user's context information received in the SIP SUBSCRIBE request on the full contents list obtained from the ISC CP Gateway 107 and generates and sends (1203) in the SIP NOTIFY body containing the personalized contents list document.

Further, the initiator ISC client 101 responds (1204) to the ISC XDMS 106 with the 200 OK on receiving the personalized contents list.

Figure 13:
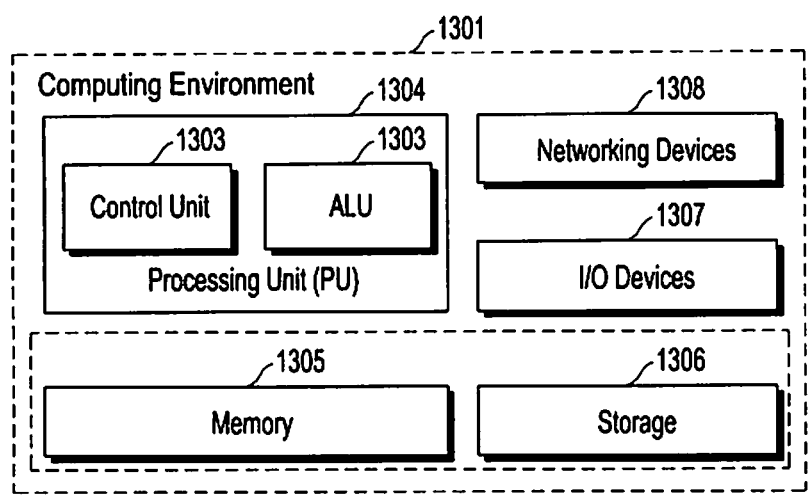
FIG. 13 illustrates a computing environment implementing a method and system for establishing the integrated group ISC session for the content viewing and the communication, according to embodiments as disclosed herein.

FIG. 13 illustrates a computing environment implementing a method and system for establishing the integrated group ISC session for the content viewing and the communication, according to embodiments as disclosed herein. As depicted the computing environment 1301 comprises at least one processing unit 1304 that is equipped with a control unit 1302 and an Arithmetic Logic Unit (ALU) 1303, a memory 1305, a storage unit 1306, plurality of networking devices 1308 and a plurality of input output (I/O) devices 1307. The processing unit 1304 is responsible for processing the instructions of the algorithm. The processing unit 1304 receives commands from the control unit in order to perform its processing. Further, any logical and arithmetic operations involved in the execution of the instructions are computed with the help of the ALU 1303.

The overall computing environment 1301 can be composed of multiple homogeneous and/or heterogeneous cores, multiple CPUs of different kinds, special media and other accelerators. The processing unit 1304 is responsible for processing the instructions of the algorithm. Further, the plurality of processing units 1304 may be located on a single chip or over multiple chips.

The algorithm comprising of instructions and codes required for the implementation are stored in either the memory unit 1305 or the storage 1306 or both. At the time of execution, the instructions may be fetched from the corresponding memory 1305 and/or storage 1306, and executed by the processing unit 1304.

In case of any hardware implementations various networking devices 1308 or external I/O devices 1307 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 3, 5 and 13 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for establishing, by a server in an integrated group immersive social centre (ISC) architecture, a session for providing a target content, the method comprising:
   receiving, by the server, a request message for initiation of an integrated group session from an initial terminal, wherein the request message comprises information related to the target content;
   interacting, by the server, with at least one reception terminal from a plurality of reception terminals, wherein the plurality of reception terminals are provided in a uniform resource indicator (URI) list in the request message;
   identifying, by the server, at least one target reception terminal that is interested in the target content from among the at least one reception terminal; and
   establishing, by the server, the integrated group session toward members that are interested in the target content, of a group to deliver content associated with the target content to the members over the integrated group session,
   wherein the members include the initial terminal and the at least one target reception terminal, and
   wherein identifying the at least one target reception terminal comprises:
   receiving a response message in response to the forwarded request message from the at least one reception terminal among the plurality of reception terminals until a set time lapses;
   aggregating target content in the response message received from the at least one reception terminal using a user ID element and a corresponding user interest element for each user response; and
   forwarding the response message received from the at least one reception terminal in a second message to the initial terminal.

2. The method of claim 1, wherein the server is one of an ISC server and a presence server.

3. The method of claim 1, wherein the request message is one of a session initiation protocol (SIP) message and a SIP PUBLISH request message.

4. The method of claim 3, wherein the SIP message comprises a content interest feature tag (CI_FT), an ISC-ConvergenceID, an accept-contact header, and a content-type, and
   wherein the CI_FT is an ISC feature tag indicating that an initiated session is the integrated group session associated with said the target content, the ISCConvergenceID identifies the initiated session, said accept-contact header indicates to the server to perform a group advertisement of said the target content to the members of the integrated group session, and the content-type indicates the target content selected by the initial terminal.

5. The method of claim 1, wherein interacting with the at least one reception terminal comprises forwarding the request message to each of the plurality of reception terminals.

6. The method of claim 5,
wherein a multipurpose internet mail extensions (MIME) body of the second message includes the user ID element and the corresponding user interest element associated with each of the at least one target reception terminal,
wherein the response message comprises an ISCConvergenceID, a CI_FT, the target content, and a user response, and
wherein the user response includes one of yes and no in a corresponding user interest element indicating interest of a corresponding reception terminal for the integrated group session.

7. The method of claim 6, wherein the user response indicating yes in the response message is used for identifying each of the at least one initial terminal to create the group.

8. The method of claim 3, wherein said SIP PUBLISH request message comprises a request to a presence event package, and
wherein said the target content is specified in a body of the SIP PUBLISH request message publishing the target content.

9. The method of claim 1, wherein interacting with the at least one reception terminal comprises:
receiving a subscription request message comprising subscription information for an event package from reception terminal among the plurality of reception terminals;
sending a first notification message to each reception terminal, wherein the first notification message communicates the target content in the event package;
receiving a publish request message from the at least one reception terminal among each reception terminal, in response to the first notification message, wherein the target content is specified in a body of the publish request message; and
sending a second notification message to the initial terminal after receiving said subscription request message for subscription of the event package from the initial terminal for subscribing to the event package, wherein the second notification message indicates to the initial terminal that at least one reception terminal is interested in the integrated group session based on the target content.

10. The method of claim 1, wherein establishing the integrated group session comprises:
receiving a publish request message publishing a content-delivery information to an event package from the initial terminal after the server allows the members of the group to schedule a time to watch the content associated with the target content by creating the group; and
sending a notification message to each of the at least one target reception terminal, wherein the notification message indicates the content-delivery information to the each of the at least one target reception terminal in the group,
wherein a MIME body of the publish request message indicates a StartTime, a ReminderTime, and a ContentRef, and
wherein the StartTime indicates the time scheduled for watching the target content during the integrated group session, the ReminderTime indicates a time for receiving a content-alert information prior to delivery of the target content, and the ContentRef indicates a reference to the target content.

11. The method of claim 1, wherein establishing the integrated group session comprises:
sending a SIP message to each member before establishing the integrated group session; and
establishing the integrated group session on the scheduled time to deliver the target content,
wherein the SIP message is sent after a presence server sends the SIP NOTIFY message to each of the at least one target reception terminal, and
wherein a MIME body of the SIP message comprises content-alert information indicating a StartTime a text indicating an alert notification, and a ContentRef.

12. The method of claim 1, wherein the target content received in the request message is selected from a content list provided by one of an ISC server and an ISC extensible markup language document management server (XDMS) in the ISC architecture to the initial terminal, and
wherein the content list is one of a personalized content list and a full content list.

13. The method of claim 12, wherein the content list is provided by one of the ISC XDMS and the ISC server after receiving a SIP SUBSCRIBE request message, from the initial terminal, for retrieving the content list,
wherein the provided content list is based on at least one of a user choice element and context information of an ISC user associated with the initial terminal, and
wherein the user choice element in the SIP SUBSCRIBE request message indicates one of a request for the personalized content list based on at least one static user preference, a request for the personalized content list based on at least one on-demand user preference, and a request for the full content list.

14. The method of claim 13, wherein receiving the SIP SUBSCRIBE request message comprises:
receiving an xcap-diff event package, requesting subscription to the personalized content list, in the SIP SUBSCRIBE request message, wherein the SIP SUBSCRIBE request message comprises a content-type with a value of a sub-element RefName of the user choice element used for type of content list to be retrieved;
filtering the full content list in the ISC XDMS by applying at least one of the at least one on-demand user preference and the context information of the ISC user associated with the initial terminal on one of a full content list XML document and an on-demand element to generate the personalized content list; and
sending an SIP NOTIFY message to the initial terminal,
wherein the SIP NOTIFY message provides the personalized content list based on the at least one of the on-demand user preference and the context information of the ISC user associated with initial terminal,
wherein the content-type indicates a ReferOnDemandPref, and wherein the ReferOnDemandPref is specified in a body of the SIP SUBSCRIBE request message for retrieving the personalized content list.

15. The method of claim 13, wherein receiving the SIP SUBSCRIBE request message comprises:

receiving a content-list event package, requesting subscription to the personalized content list, in the SIP SUBSCRIBE request message;

sending an XML configuration access protocol (XCAP) GET request to the ISC XDMS in response to the SIP SUBSCRIBE request message, wherein the XCAP GET is sent to the ISC XDMS for obtaining the full content list;

filtering the full content list by applying the at least one on-demand user preference on the full content list to generate the personalized content list; and sending an SIP NOTIFY message to the initial terminal providing the generated personalized content list based on the at least one on-demand user preference, wherein the SIP SUBSCRIBE request message comprises a content-type with a value of a sub element of the user choice element indicating a ReferOnDemandPref, and wherein the ReferOnDemandPref is specified in a body of the SIP SUBSCRIBE request message.

16. A system for establishing, in an integrated group immersive social centre (ISC) architecture, a session for providing a target content, the system comprising:

an initiator terminal;
a plurality of reception terminals; and
a server is configured to:

receiving a request message for initiation of an integrated group session from the initiator terminal, the request message including information related to the target content;

interact with at least one reception terminal from the plurality of reception terminals, wherein the plurality of reception terminals are provided in a uniform resource indicator (URI) list in the request message;

identify at least one target reception terminal that is interested in the target content from among the at least one reception terminal; and establish the integrated group session toward members that are interested in the target content, of a group to deliver content associated with the target content to the members over the integrated group session, wherein the members include the initiator terminal and the at least one target reception terminal, and wherein identifying the at least one target reception terminal comprises:

receiving a response message in response to the forwarded request message from the at least one reception terminal among the plurality of reception terminals until a set time lapses;

aggregating target content in the response message received from the at leas one reception terminal using a user ID element and a corresponding user interest element for each user response; and forwarding the response message received from the at least one reception terminal in a second message to the initial terminal.

17. A computer program product comprising computer executable program code recorded on a computer readable non-transitory storage medium, the computer executable program code when executed, causing the actions including:

receiving, by a server, a request message for initiation of an integrated group session from an initial terminal, wherein the request message comprises content interest information;

interacting, by the server, with at least one reception terminal from a plurality of reception terminals, wherein the plurality reception terminals are provided in a uniform resource indicator (URI) list in the request message;

identifying, by the server, at least one target reception terminal indicating the content interest information from among the at least one reception terminal; and establishing, by the server, the integrated group session toward members that are interested in the target content, of a group to deliver content associated with the content interest information to the members over the integrated group session, wherein the members include the initial terminal and the at least one target reception terminal, and wherein identifying the at least one target reception terminal comprises:

receiving a response message in response to the forwarded request message from the at least one reception terminal among the plurality of reception terminals until a set time lapses;

aggregating target content in the response message received from the at least one reception terminal using a user ID element and a corresponding user interest element for each user response; and forwarding the response message received from the at least one reception terminal in a second message to the initial terminal.

18. The computing program product of claim 17, wherein the server is one of an ISC server and a presence server.

19. The computing program product of claim 17, wherein the request message is one of a session initiation protocol (SIP) message and a SIP PUBLISH request message.

20. The computing program product of claim 19, wherein the SIP message comprises a content interest feature tag (CI_FT), an ISCConvergenceID, an accept-contact header, and a content-type, and wherein the CI_FT is an ISC feature tag indicating that an initiated session is the integrated group session associated with the content interest information, the ISCConvergenceID identifies the initiated session, the accept-contact header indicates to the server to perform a group advertisement of the content interest information to the members of the integrated group session, and a content-type indicates the content interest information selected by the initial terminal.

21. The computing program product of claim 17, wherein interacting with the at least one reception terminal comprises forwarding the request message to each of the plurality of reception terminals.

22. The computing program product of claim 21, wherein a multipurpose internet mail extensions (MIME) body of the second message includes the user ID element and the corresponding user interest element associated with each of the at least one target reception terminal, wherein the response message comprises an ISCConvergenceID, a CI_FT, the content interest information, and a user response, and wherein the user response includes one of yes and no in a corresponding user interest element indicating interest of a corresponding reception terminal for the integrated group session.

23. The computing program product of claim 22, wherein the user response indicating yes in the response message is used for identifying each of the at least one initial terminal to create the group.

24. The computing program product of claim 19, wherein the SIP PUBLISH request message comprises a request to a presence event package, and
   wherein the content interest information is specified in a body of the SIP PUBLISH request message publishing the content interest information.

25. The computing program product of claim 17, wherein interacting with the at least one reception terminal comprises:
   receiving a subscription request message comprising subscription information for a presence event package from each reception terminal among the plurality of reception terminals;
   sending a first notification message to each reception terminal, wherein the first notification message communicates the content interest information in the presence event package;
   receiving a publish request message from the at least one reception terminal among each reception terminal, in response to the first notification message, wherein the content interest information is specified in a body of the publish request message; and
   sending a second notification message to the initial terminal after receiving the subscription request message for subscription of the presence event package from the initial terminal for subscribing to the presence event package, and
   wherein the second notification message indicates to the initial terminal that at least one reception terminal is interested in the integrated group session based on the content interest information.

26. The computing program product of claim 17, wherein establishing the integrated group session comprises:
   receiving a publish request message publishing content-delivery information to a presence event package from the initial terminal after the server allows the members of the group to schedule a time to watch the content associated with the content interest information by creating the group; and
   sending a notification message to each of the at least one target reception terminal, wherein the notification message indicates the content-delivery information to each of the at least one target reception terminal in the group,
   wherein a MIME body of the publish request message indicates a StartTime, a ReminderTime, and a ContentRef, and
   wherein the StartTime indicates the time scheduled for watching the content during the integrated group session, the ReminderTime indicates a time for receiving content-alert information prior to delivery of the content, and the ContentRef is the content interest information indicating reference to the content associated with the content interest information.

27. The computing program product of claim 17, wherein establishing the integrated group session comprises:
   sending a SIP message to each member before establishing the integrated group session; and
   establishing the integrated group session on a scheduled time to deliver the content associated with the content interest information,
   wherein the SIP message is sent after a presence server sends a SIP NOTIFY message to each target reception terminal, and
   wherein a MIME body of the SIP message comprises content-alert information indicating a StartTime, a text indicating an alert notification, and a ContentRef.

28. The computing program product of claim 17, wherein the content interest information received in the request message is selected from a content list provided by one of an ISC server and an ISC extensible markup language document management server (XDMS) in the ISC architecture to the initial terminal, and
   wherein the content list is one of a personalized content list and a full content list.

29. The computing program product of claim 28, wherein said content list is provided by one of the ISC XDMS and the ISC server after receiving a SIP SUBSCRIBE request message, from the initial terminal, for retrieving the content list,
   wherein the provided content list is based on at least one of a user choice element and a context information of an ISC user associated with the initial terminal, and
   wherein the user choice element in the SIP SUBSCRIBE request message indicates one of a request for the personalized content list based on at least one static user preference, a request for the personalized content list based on at least one on-demand user preference, and a request for the full content list.

30. The computing program product of claim 29, wherein receiving the SIP SUBSCRIBE request message comprises:
   receiving an xcap-diff event package, requesting subscription to the personalized content list, in the SIP SUBSCRIBE request message, wherein the SIP SUBSCRIBE request message comprises a content-type with a value of a sub-element RefName of the user choice element used for a type of content list to be retrieved;
   filtering the full content list in the ISC XDMS by applying at least one of the at least one on-demand user preference and the context information of the ISC user associated with the initial terminal on one of a full content list XML document and an on-demand element to generate the personalized content list; and
   sending an SIP NOTIFY message to the initial terminal, wherein the SIP NOTIFY message provides the personalized content list based on the at least one of the at least one on-demand user preferences and the context information of the ISC user associated with the initial terminal,
   wherein the content-type indicates a ReferOnDemandPref, and
   wherein the ReferOnDemandPref is specified in a body of the SIP SUBSCRIBE request message for retrieving the personalized content list.

31. The computing program product of claim 29, wherein receiving the SIP SUBSCRIBE request message comprises:
   receiving a content-list event package, requesting subscription to the personalized content list, in the SIP SUBSCRIBE request message;
   sending an XML configuration access protocol (XCAP) GET request to the XDMS in response to the SIP SUBSCRIBE request message, wherein the XCAP GET is sent to the ISC XDMS for obtaining the full content list;
   filtering the full content list by applying said the at least one on-demand user preference on the full content list to generate the personalized content list; and
   sending an SIP NOTIFY message to the initial terminal providing the generated personalized content list based on the at least one on-demand user preference, wherein the SIP SUBSCRIBE request message comprises a content-type with a value of a sub element of the user choice element indicating a ReferOnDemandPref, wherein the ReferOnDemandPref is specified in a body of the SIP SUBSCRIBE request message.

* * * * *